US005590127A

United States Patent [19]

Bales et al.

[11] Patent Number: 5,590,127

[45] Date of Patent: Dec. 31, 1996

[54] MULTIMEDIA CONFERENCE CALL PROVIDING ADJUSTABLE BANDWIDTH FOR INDIVIDUAL COMMUNICATION TERMINALS

[75] Inventors: Bruce M. Bales, Louisville; Stephen M. Thieler, Boulder, both of Colo.

[73] Assignee: Lucent Technologies Inc., Murray Hill, N.J.

[21] Appl. No.: 452,484

[22] Filed: May 26, 1995

[51] Int. Cl.[6] .......................... H04L 12/18; H04M 11/00; H04N 7/15

[52] U.S. Cl. .......................... 370/260; 370/264; 370/468; 348/15; 379/202

[58] Field of Search ................................ 370/58.1, 58.2, 370/58.3, 60, 60.1, 62, 68.1, 79, 94.1, 94.2, 110.1, 118; 379/93, 94, 157, 158, 201, 202, 204, 205, 206, 207, 219, 220, 221; 348/13, 14, 15, 16, 17; H04N 7/14, 7/15

[56] References Cited

U.S. PATENT DOCUMENTS

| | | | |
|---|---|---|---|
| 4,796,293 | 1/1989 | Blinken et al. | 379/202 |
| 5,014,266 | 5/1991 | Bales et al. | 370/62 |
| 5,182,751 | 1/1993 | Bales et al. | 370/110.1 |
| 5,195,086 | 3/1993 | Baumgartner et al. | 370/62 |
| 5,369,694 | 11/1994 | Bales et al. | 379/202 |
| 5,371,534 | 12/1994 | Dagdeviren et al. | 348/14 |
| 5,373,549 | 12/1994 | Bales et al. | 379/93 |
| 5,384,771 | 1/1995 | Isidoro et al. | 370/58.2 |
| 5,386,466 | 1/1995 | Bales et al. | 379/220 |
| 5,408,526 | 4/1995 | McFarland et al. | 379/202 |
| 5,422,883 | 6/1995 | Hauris et al. | 370/62 |

OTHER PUBLICATIONS

International Telecommunication Union (ITU–T, Telecommunication Standardization Sector of ITU, H.320, (Mar. 1993), Recommendation H.320, pp. 1–12.

*Primary Examiner*—Alpus H. Hsu
*Attorney, Agent, or Firm*—John C. Moran

[57] ABSTRACT

Providing multimedia conference calls with communication type conversion for changing types of communication terminals on one multimedia conference call. In addition, users of communication terminals can change communication types during the multimedia conference calls. Also, a set of users can use additional communication types not presently in use by a multimedia conference call to enhance communication among the set of users.

28 Claims, 12 Drawing Sheets

WIRELESS TERMINAL 123
101 SWITCH NODE
129 CONNECTION MANAGER
127 CONFERENCE MANAGEMENT
128 TERMINAL MANAGEMENT
BASE STATION 122
BRI LINK 124
PRI LINK 111
102 SWITCH NODE
PRI LINK 112
103 SWITCH NODE
PRI LINK 118
SWITCH NODE 104
PRI LINK 114
PRI LINK 116
PRI LINK 117
PRI LINK 119
106 PRI LINK 118
COMMUNICATION TERMINAL
PRI LINK 121
108 COMMUNICATION TERMINAL
107 COMMUNICATION TERMINAL

TRANS 300 (TRANSPORT MESSAGE)

TRANS_ACK 310 (TRANSPORT ACKNOWLEDGE)

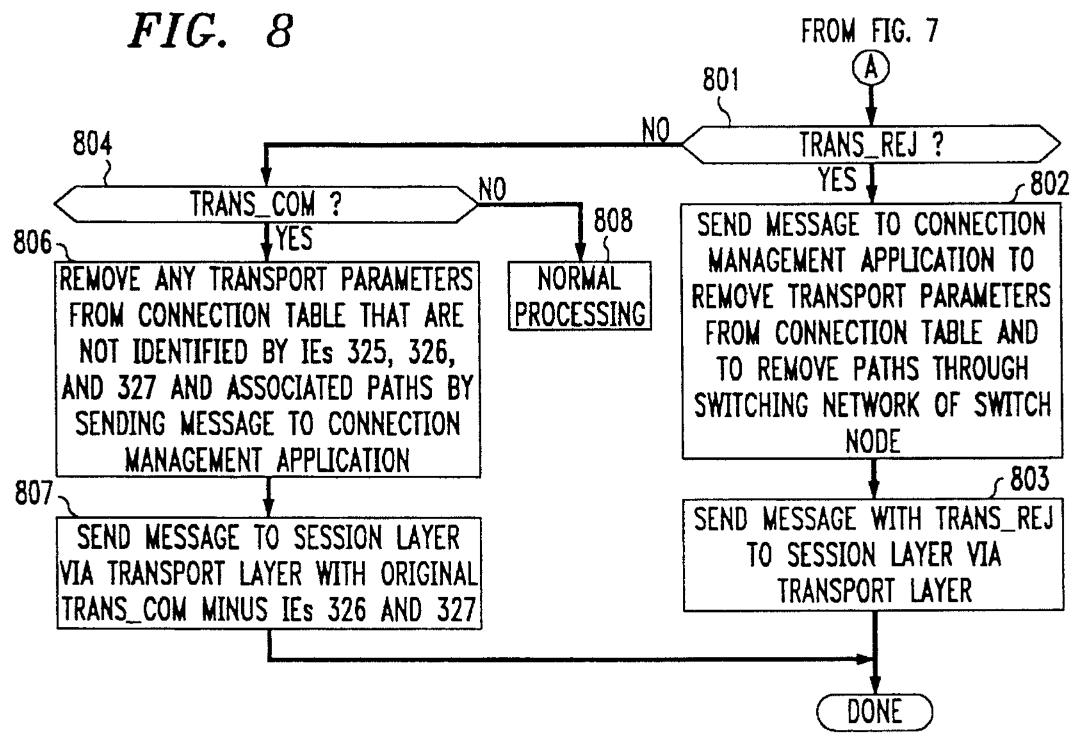
FIG. 8
FROM FIG. 7
A
801
TRANS_REJ ?
NO
YES
802
SEND MESSAGE TO CONNECTION MANAGEMENT APPLICATION TO REMOVE TRANSPORT PARAMETERS FROM CONNECTION TABLE AND TO REMOVE PATHS THROUGH SWITCHING NETWORK OF SWITCH NODE
803
SEND MESSAGE WITH TRANS_REJ TO SESSION LAYER VIA TRANSPORT LAYER
804
TRANS_COM ?
NO
808
NORMAL PROCESSING
YES
806
REMOVE ANY TRANSPORT PARAMETERS FROM CONNECTION TABLE THAT ARE NOT IDENTIFIED BY IEs 325, 326, AND 327 AND ASSOCIATED PATHS BY SENDING MESSAGE TO CONNECTION MANAGEMENT APPLICATION
807
SEND MESSAGE TO SESSION LAYER VIA TRANSPORT LAYER WITH ORIGINAL TRANS_COM MINUS IEs 326 AND 327
DONE

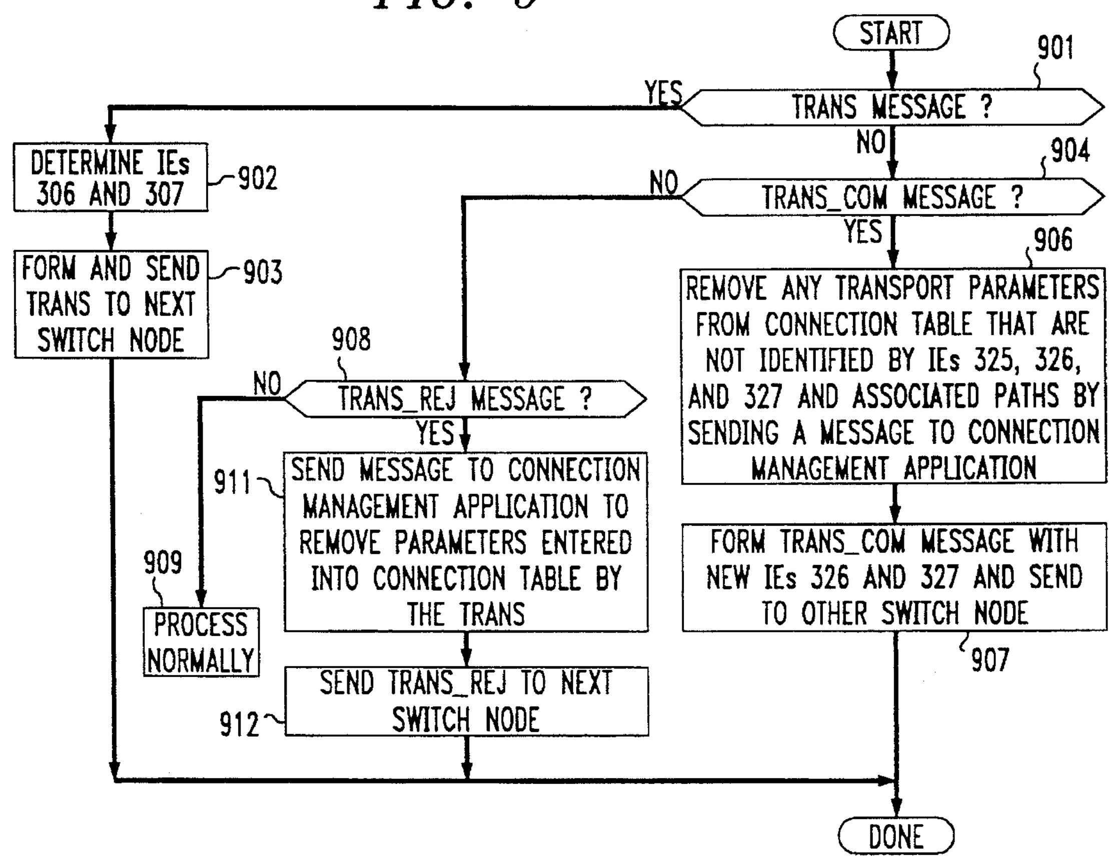
FIG. 9
START
901
TRANS MESSAGE ?
YES
NO
902
DETERMINE IEs 306 AND 307
903
FORM AND SEND TRANS TO NEXT SWITCH NODE
904
TRANS_COM MESSAGE ?
NO
YES
906
REMOVE ANY TRANSPORT PARAMETERS FROM CONNECTION TABLE THAT ARE NOT IDENTIFIED BY IEs 325, 326, AND 327 AND ASSOCIATED PATHS BY SENDING A MESSAGE TO CONNECTION MANAGEMENT APPLICATION
907
FORM TRANS_COM MESSAGE WITH NEW IEs 326 AND 327 AND SEND TO OTHER SWITCH NODE
908
TRANS_REJ MESSAGE ?
NO
YES
909
PROCESS NORMALLY
911
SEND MESSAGE TO CONNECTION MANAGEMENT APPLICATION TO REMOVE PARAMETERS ENTERED INTO CONNECTION TABLE BY THE TRANS
912
SEND TRANS_REJ TO NEXT SWITCH NODE
DONE

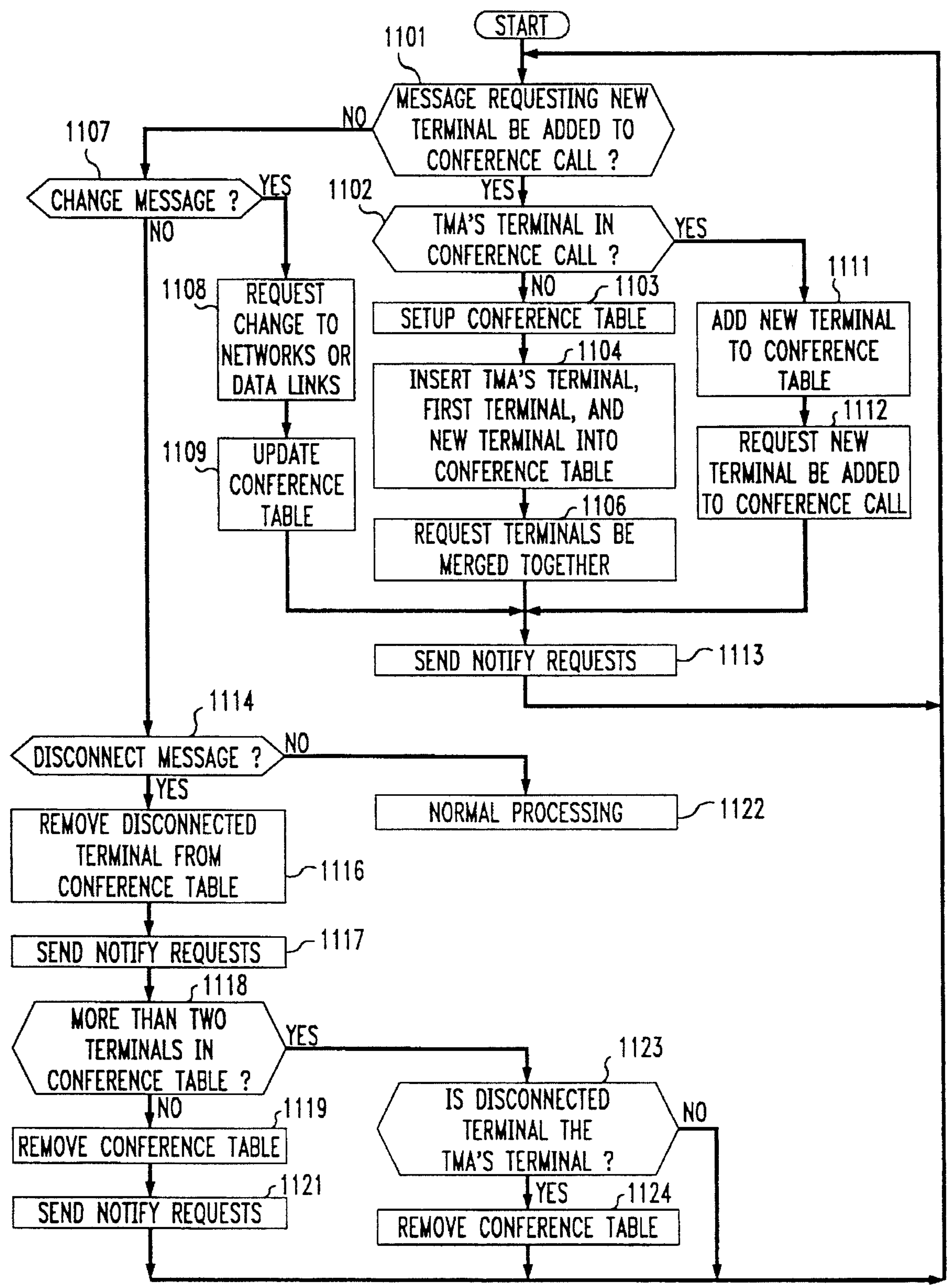
FIG. 11
START
1101
MESSAGE REQUESTING NEW TERMINAL BE ADDED TO CONFERENCE CALL ?
NO
YES
1107
CHANGE MESSAGE ?
YES
NO
1102
TMA'S TERMINAL IN CONFERENCE CALL ?
YES
NO
1103
SETUP CONFERENCE TABLE
1104
INSERT TMA'S TERMINAL, FIRST TERMINAL, AND NEW TERMINAL INTO CONFERENCE TABLE
1106
REQUEST TERMINALS BE MERGED TOGETHER
1108
REQUEST CHANGE TO NETWORKS OR DATA LINKS
1109
UPDATE CONFERENCE TABLE
1111
ADD NEW TERMINAL TO CONFERENCE TABLE
1112
REQUEST NEW TERMINAL BE ADDED TO CONFERENCE CALL
SEND NOTIFY REQUESTS
1113
1114
DISCONNECT MESSAGE ?
NO
YES
NORMAL PROCESSING
1122
REMOVE DISCONNECTED TERMINAL FROM CONFERENCE TABLE
1116
SEND NOTIFY REQUESTS
1117
1118
MORE THAN TWO TERMINALS IN CONFERENCE TABLE ?
YES
NO
1123
IS DISCONNECTED TERMINAL THE TMA'S TERMINAL ?
NO
YES
1119
REMOVE CONFERENCE TABLE
1121
SEND NOTIFY REQUESTS
1124
REMOVE CONFERENCE TABLE

1201

| CONFERENCE TABLE | | |
|---|---|---|
| ID | ADDRESS | COMMUNICATION TYPES |
| 0 | 106 | VIDEO, VOICE |
| 1 | 107 | VOICE |
| 2 | 108 | VIDEO, VOICE |

1301

| CONFERENCE TABLE | | |
|---|---|---|
| PARTY REC. | PARTY REC. | PARTY REC. |
| 106 | 123 | 108 |

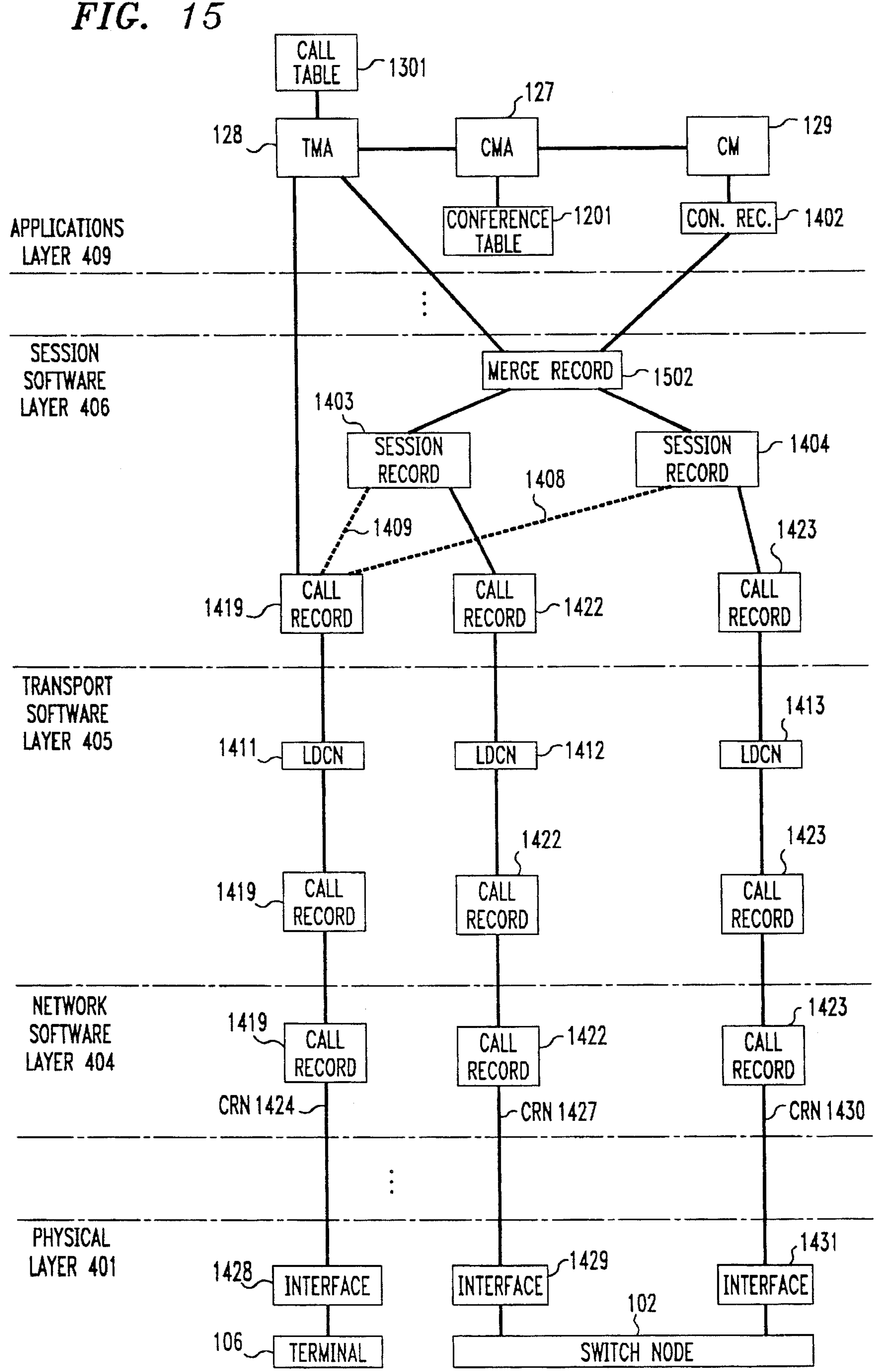

FIG. 15
CALL TABLE
1301
127
128
TMA
CMA
CM
129
APPLICATIONS LAYER 409
CONFERENCE TABLE
1201
CON. REC.
1402
SESSION SOFTWARE LAYER 406
MERGE RECORD
1502
1403
SESSION RECORD
SESSION RECORD
1404
1408
1409
1423
1419
CALL RECORD
CALL RECORD
1422
CALL RECORD
TRANSPORT SOFTWARE LAYER 405
1413
1411
LDCN
LDCN
1412
LDCN
1422
1423
1419
CALL RECORD
CALL RECORD
CALL RECORD
NETWORK SOFTWARE LAYER 404
1419
CALL RECORD
CALL RECORD
1422
1423
CALL RECORD
CRN 1424
CRN 1427
CRN 1430
PHYSICAL LAYER 401
1431
1428
INTERFACE
INTERFACE
1429
INTERFACE
102
106
TERMINAL
SWITCH NODE

MULTIMEDIA CONFERENCE CALL PROVIDING ADJUSTABLE BANDWIDTH FOR INDIVIDUAL COMMUNICATION TERMINALS

CROSS-REFERENCE TO RELATED APPLICATIONS

B. M. Bales and S. M. Thieler, Case 26-19, "Adjustment Of Call Bandwidth During A Communication Call", U.S. patent application Ser. No. 08/451,282;

B. M. Bales and S. M. Thieler, Case 30-21, "Variable Communication Bandwidth For Providing Automatic Call Back And Call Hold", U.S. patent application Ser. No. 08/451,296;

B. M. Bales and S. M. Thieler, Case 31-22, "Variable Communication Bandwidth For Conference Call Initiation", U.S. patent application Ser. No. 08/432,438; and B. M. Bales and S. M. Thieler, Case 32-23, "Selective Participation In A Multimedia Communication Conference Call", U.S. patent application Ser. No. 08/451,297.

These applications are filed concurrently with this application and are assigned to the same assignee.

TECHNICAL FIELD

This invention relates to telecommunication switching, and, in particular, to multimedia conference calls.

BACKGROUND OF THE INVENTION

With the advent of multimedia conference calls, problems arise when not all conferees wish or are able to fully use all media communication types of the multimedia conference call. In addition, two or more conferees may from time to time wish to use additional media types. Prior art multimedia conference systems are unable to solve these problems and require all conferees to use identical media communication types. Such a system is set forth in U.S. Pat. No. 5,195,086. For example, if a conferee is unable to reach their multimedia communication terminal when the multimedia conference call starts, the conferee can not participate in the multimedia conference call using their wireless telephone and then switch to their multimedia communication terminal upon reaching that terminal. If the conference call is only a voice call, modem business telecommunication switching systems allow the conferee to handle such situations. As more business telecommunication switching systems offer wireless service as an integrated service, this problem will become common. If the equipment performing the multimedia conferencing is not part of the business telecommunication switching system, the telecommunication switching system must drop the voice call and establish a multimedia call to the conferencing equipment. This normally requires the conferee to enter the conference information both to the telecommunication switching system and the conferencing equipment.

In addition, multimedia conference calls use a large amount of communication bandwidth. At different times during the conference call, a conferee may only want to listen to the conference call or to see only the data portion. Prior art multimedia conferencing systems can not accommodate such activities without manual intervention by the conferee. Further, during the initial introduction of multimedia conferencing systems, many people wishing to participate in a multimedia conference will not have available a multimedia terminal. Without a mechanism to enable people without multimedia terminals to participate, the wide spread use of multimedia conferencing systems will be inhibited.

SUMMARY OF THE INVENTION

A technical advance is achieved by an apparatus and method that provide multimedia conference calls with communication type conversion for changing types of communication terminals on one multimedia conference call. In addition, users of communication terminals can change communication types during the multimedia conference calls. Also, a set of users can use additional communication types not presently in use by a multimedia conference call to enhance communication among the set of users.

BRIEF DESCRIPTION OF THE DRAWING

FIGS. 7, 8, and 9 illustrate, in flow chart form, the response of a network layer to the transport messages;

FIG. 11 illustrates, in flow chart form, operations performed by a conference management application;

FIG. 15 illustrates the logical structure of conference call through the network, transport, session, and application software layers after a merge operation has been performed.

DETAILED DESCRIPTION

Figure 1:
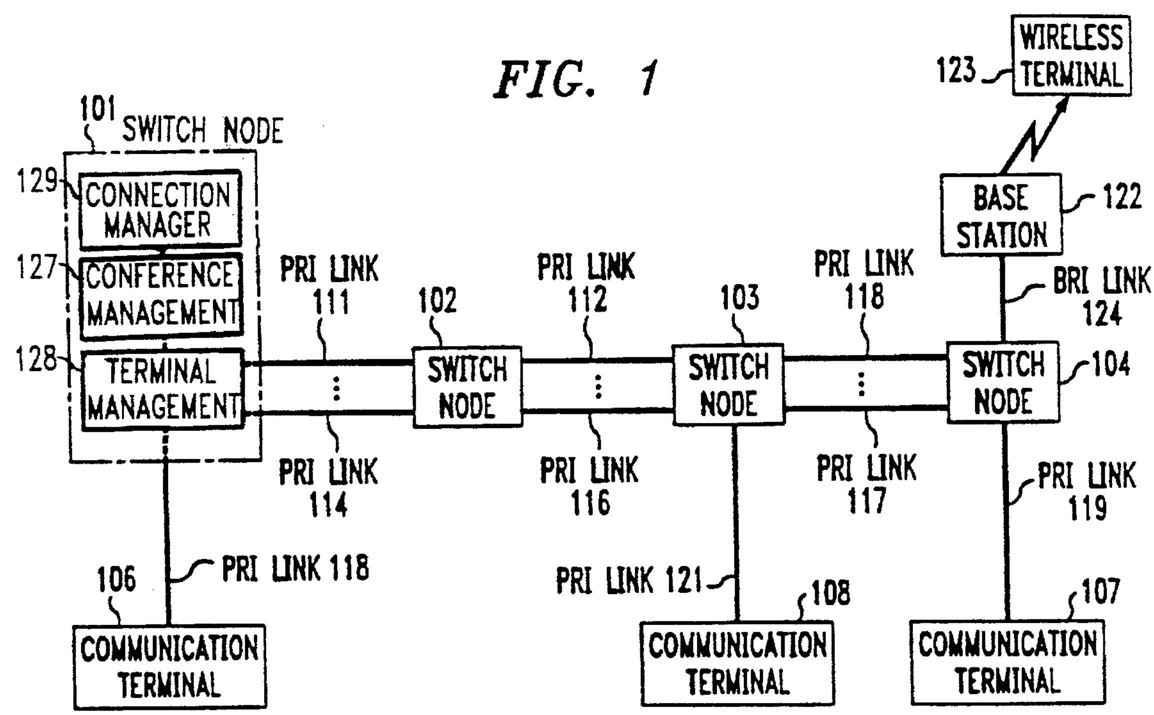
FIG. 1 illustrates an embodiment of a system for implementing the inventive concepts.

FIG. 1 illustrates a plurality of switch nodes 101–104 that are connected by a plurality of primary rate interface (PRI) links 111–117. Also illustrated are communication terminals 106, 107, and 108 which are capable of supporting a full multimedia call. In addition, wireless terminal 123 is illustrated that is interconnected via a wireless link to base station 122 and from there into switch node 104 via basic rate interface (BRI) link 124. Wireless terminal 123 and communication terminal 107 have a shared line appearance on switch node 104. Shared line appearances are well known in the art. If wireless terminal 123 is active on a telecommunication call, that activity will be displayed on communication terminal 107. A user of communication terminal 107 can become active on the call; and when wireless terminal 123 hangs up, the call will continue to be terminated on communication terminal 107.

To understand the operation of the system illustrated in FIG. 1, consider the following example. Communication terminal 106 is setting up a multimedia conference with communication terminals 107 and 108. All messages concerning this conference are transmitted from the communication terminals to terminal management application (TMA) 128. The overall control of the conference is controlled by conference management application (CMA) 127. As communication terminal 106 is setting up the multimedia conference call, it establishes communication with communication terminal 108 and then attempts to establish communication with communication terminal 107. At this point, the user of communication terminal 107 is away from that terminal but is carrying wireless terminal 123. The user answers the multimedia conference call utilizing wireless terminal 123. Wireless terminal 123 has only voice capability. The TMA controlling wireless terminal 123 within switching node 104 sends a transport message to communication terminal 106 changing the communication types to voice only for the conference connecting wireless terminal 123 to the conference call. TMA 128 is responsive to the transport message to acknowledge the transport request by sending back a transport complete message. Switch nodes 102, 103, and 104 then reduce the bandwidth being utilized for the conference leg connecting wireless terminal 123 into the conference on switch node 101 to that required for voice capability only. TMA 128 transfers the information of the transport message to CMA 127. CMA 127 then controls the internal switching networks of switch node 101 such that wireless terminal 123 is conferenced into the conference utilizing only voice; whereas, communication terminal 108 and 106 are using the full multimedia capability of the conference.

During the course of the conference call, the user of wireless terminal 123 returns to communication terminal 107 and causes communication terminal 107 to become part of the conference call. Then, the user disconnects wireless terminal 123 from the conference call. If the user of communication terminal 107 now wishes to use all of the multimedia capabilities of the conference call, the user causes communication terminal 107 to signal the TMA in switch node 104 controlling communication terminal 107 to increase the bandwidth. The TMA in switch node 104 transmits a transport message requesting the full multimedia capabilities of the conference call. The transport message is directed to communication terminal 106. TMA 128 is responsive to that message to send back a transport complete. In response to the transport complete, switch nodes 102, 103, and 104 increase the bandwidth by the necessary amount to supply the multimedia capabilities. In addition, TMA 128 transfers the information that communication terminal 107 is now utilizing the full multimedia capabilities to CMA 126. CMA 126 updates the necessary tables and then requests that the connection manager 129 (CM) make the physical connections. The CM controls the internal networks of switch node 101 to conference communication terminal 107 into the multimedia conference using the full multimedia capabilities. During this example, at no time was the call not connected to either wireless terminal 123 or communication terminal 127. The leg of the multimedia conference call remained established for either wireless terminal 123 or communication terminal 127 through switch nodes 101, 102, and 103. The conference call leg also remained active on switch node 104 although the leg was switched from wireless terminal 123 to communication terminal 107.

At a later point in time, communication terminals 107 and 108 may wish to add an additional communication type to the conference call in order to communicate with each other. Communication terminal 106 may or may not choose to add this particular communication type. Communication terminals 107 and 108 each send a transport message to communication terminal 106 requesting this additional communication type. TMA 128 is responsive to these transport messages to send back transport complete messages that causes the switch nodes in each of the conference call legs interconnecting communication terminals 107 and 108 to switch node 101 to add the necessary communication bandwidth to the conference call legs. TMA 128 also informs CMA 127 of the additional communication type. In response, CMA 127 updates the conference table and requests that CM 129 make the necessary connection.

Further information on the operation and structure of switch nodes is given in U.S. Pat. No. 5,386,466, entitled "Automatic Initialization of a Distributed Telecommunications System". U.S. Pat. No. 5,386,466, is hereby incorporated by reference. A switch node with a video network is described in U.S. patent application Ser. No. 08/085,997, entitled "Video View Selection by a Chairperson", filed Jun. 30, 1993, and assigned to the same assignee as the present application. U.S. patent application Ser. No. 08/085,997 is now U.S. Pat. No. 5,473,367. U.S. patent application Ser. No. 08/085,997, hereby incorporated by reference.

Consider the following two examples to help in the understanding of the operation of the switch nodes and communication terminals illustrated in FIG. 1 with respect to the transport messages. These examples are based on a call between two communication terminals to illustrate the operation of the transport messages in the simplest case. The operation of these messages for conference calls is discussed in detail with respect to FIGS. 10 through 15. Assume that switch node 101 at the request of communication terminal 106 originates a logical call to communication terminal 107. As is well known in the ISDN signalling protocol, a set up message is first transmitted from switch node 101 to switch node 104 via switch nodes 102 and 103. Each switch node is responsive to the set up message to establish the necessary call information. Upon receipt of the set up message, switch node 104 alerts communication terminal 107 which in turn alerts its user. Switch node 104 sends back to switch node 101 an alerting message. When the user answers the call, communication terminal 107 transmits to switch node 104 a connect message. Upon receipt of the connect message, switch node 104 establishes an internal logical path and transmits a connect message to switch nodes 103 and 102. Switch nodes 103 and 102 also establish internal logical paths and relay the connect message to the next switch node. When the connect message is received by switch node 101, the connect message has been communicated via logical paths that has been established through switch nodes 102, 103, and 104.

Figure 2:
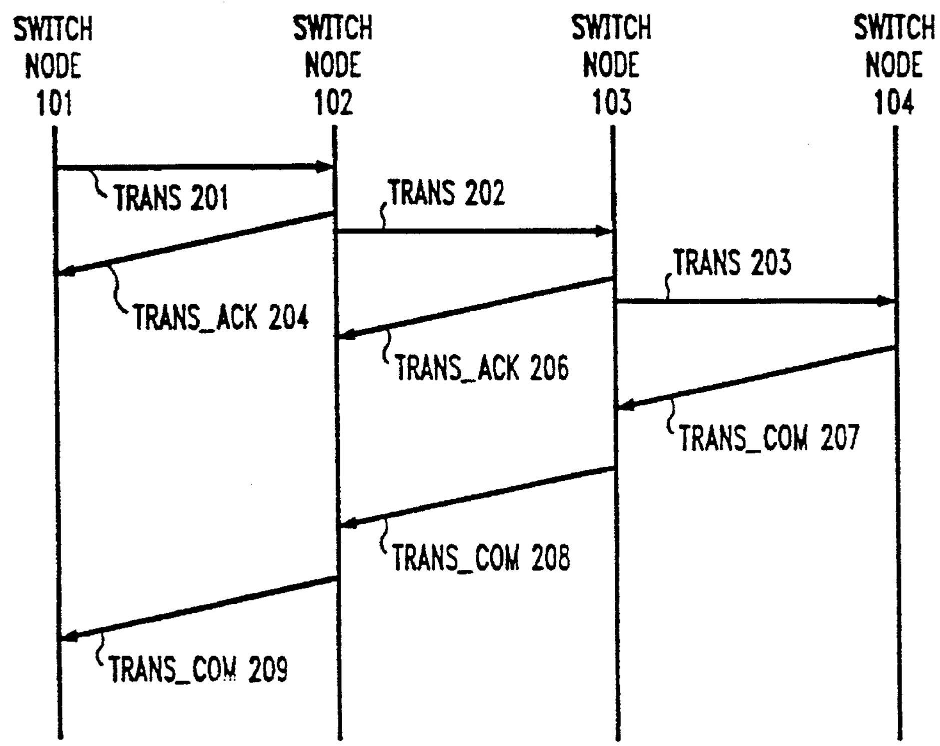
FIG. 2 illustrates the message flow embodied in the inventive concept.

At a subsequent time, the users of communication terminals 106 and 107 desire a video capability so that they can exchange video images. To add video capability to the call, communication terminal 106 communicates to switch node 101 a request to add video capability. In response to this request, switch node 101 determines if it has capability to provide video. If switch node 101 does have the video capability, switch node 101 transmits TRANS 201 (transport) message as illustrated in FIG. 2 to switch node 102. TRANS 201 message requests that a video capability be added to the call. (The actual contents of the message will be discussed in greater detail later.) If switch node 102 can provide the video capability, it transmits back TRANS_ACK 204 message as illustrated in FIG. 2. In addition, switch node 102 transmits TRANS 202 message of FIG. 2 to switch node 103. This message also requests that a video capability be set up between switch node 102 and switch node 103. Assuming switch node 103 is capable of providing the video capability, it transmits back to switch node 102 TRANS_ACK 206 message and transmits TRANS 203 message to switch node 104. If switch node 104 can provide the video bandwidth, switch node 104 transmits to switch node 103 TRANS_COM 207 message. This message is repeated back to switch node 101 via switch nodes 103 and 102. switch node 101 and switch node 104 inform communication terminal 106 and communication terminal 107, respectively, that video capability is now being provided. If at a still later point in time, the user of communication terminal 106 desires that the video capability be eliminated, the messages illustrated in FIG. 2 are once more sent through the switch nodes. However, the TRANS messages now request that the video bandwidth be removed.

In video and audio calls, the video and the audio capabilities can be provided in the following two ways: first, a channel can be used for the video and a second channel can be used for the audio. Second, the audio information can be included with the video information in the video channel. The transport message can cause switch nodes to drop the audio channel and add the video channel with the companion audio information.

When processing the transport message, the switch nodes have the capability of negotiating with each other using the transport acknowledge (TRANS_ACK message). To illustrate this capability consider the following example. Communication terminal 106 wishes to add an audio, video and high speed data capabilities to a logical call with communication terminal 107. Communication terminal 106 requests that switch node 101 add these capabilities. In response to the request, switch node 101 transmits to switch node 102 a transport message requesting that these three types of bandwidth be added to the call. Switch node 102 has the resources to provide that capability and acknowledges this by the transmission of an acknowledge message to communication terminal 106. Switch node 102 then transmits a transport message to switch node 103. Switch node 103 only has resources sufficient to support audio bandwidth and video bandwidth and transmits this fact to switch node 102 in a transport acknowledge message. Switch node 102 accepts these conditions. Switch node 103 then transmits a transport message to switch node 104 requesting that audio and video capabilities be added to the call. Switch node 104 only has resources to provide audio bandwidth. Since switch node 104 is the endpoint, it transmits back to switch node 103 a transport complete message. The transport complete message specifies that only audio bandwidth is provided for in this call. Upon receiving the transport complete message, each switch node changes the bandwidth capability for the call to audio only.

Figure 3A:
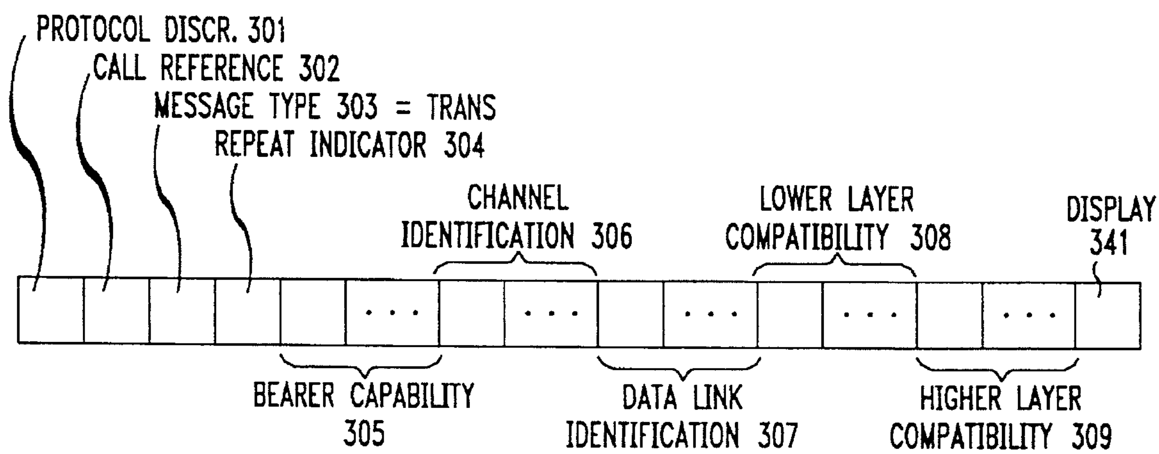
FIGS. 3A and 3B illustrate the messages utilized to implement the inventive concept.
Figure 3B:
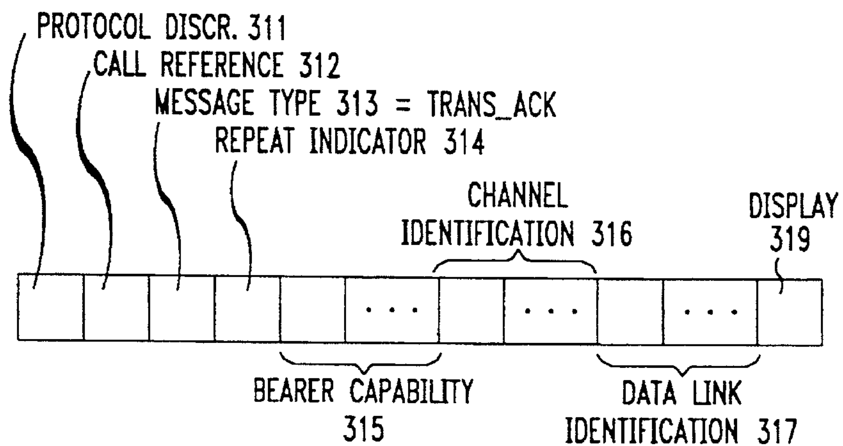

FIG. 3 illustrates the details of the four messages utilized to implement the inventive concepts illustratively with respect to CCITT ISDN Q.931 standard of messages and procedures. One skilled in the art can readily see that the inventive concepts could be applied to other standards. The transport message is TRANS 300. The transport message consists of information elements (IE) 301–309 and 341. Protocol discriminator 301 IE defines the protocol that is being used. It defines that the protocol is ISDN Q.931 in the present embodiment. Call reference IE 302 gives the call reference number that defines the call for which the transport message is modifying the bandwidth. Message type IE 303 is set equal to TRANS since this is the transport message. Repeat indicator IE 304 defines whether the transport message is being used to add, remove, or change bandwidth on the call designated by call reference IE 302.

Bearer capability IEs 305, channel identification IEs 306, data link identification IEs 307, lower layer compatibility IEs 308, and higher layer compatibility IEs 309 define the totality of the transport capabilities being defined by the transport message. Lower layer compatibility IEs 308 and higher layer compatibility IEs 309 are used only by the endpoints. Whereas, bearer capability IEs 305, channel identification IEs 306, and data link identification IEs 307 are utilized by the switching nodes within the network providing transportation for the call. Note, that the endpoints also utilize IEs 305, 306, and 307. Bearer capability IEs 305 define the requested capabilities in high level definitions such as voice, data, and video. The channel identification IEs 306 define the logical interface and physical channel within that physical interface. Between two switching nodes, the switching nodes negotiate a logical interface number for each interface between them. A network layer is responsive to the logical interface number to convert it to a system interface number (sintf) which lower layers convert to a physical interface number. For clarity, the high level description refers to the channel identification IEs as specifying the physical interface. For example, if video is being requested, then one of the channel identification IEs 306 for that request defines the physical interface and the channel such as channel 1 which is a 384 Kbs channel within the specified PRI link. If a voice capability was being requested, one of the channel identification IEs defines a particular B channel such as channel 23. An IE in the bearer capability IEs 305 requesting video has the same position in the bearer capability IEs 305 as the corresponding IE designating the physical interface and channel in the channel identification IEs 306. If packet data links are being requested, these are specified as to physical channels in channel identification IEs 306 with additional information being specified in the data link identification IEs 307. The IEs for data link identification are arranged in order as needed to support channel identification IEs 306. The information in bearer capability IEs 305 specifies when an IE from data identifications IEs 307 is needed. For example, if bearer IEs 305 specified: video, voice, and data, channel identification specifies the physical and only one data link identification IEs 307 is used. This IE would specify what logical link on the physical channel was to be used.

Figure 4:
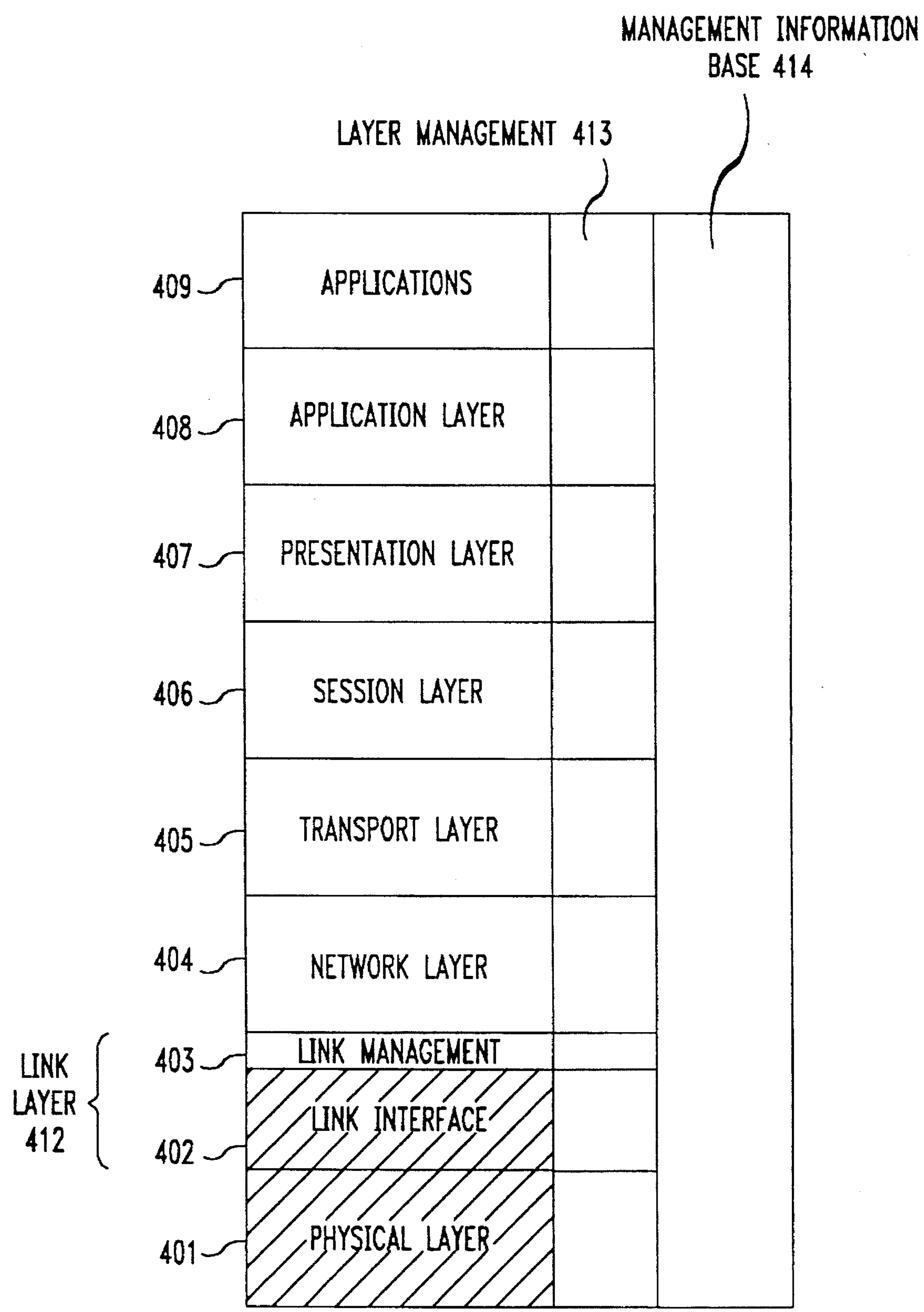
FIG. 4 illustrates a software architecture for use with the inventive concept.

Lower layer capability IEs 308 and higher layer capabilities 309 are usually utilized only by the endpoints, and these IEs are directed to defining for the destination endpoint what type of a call is being set up and the protocol being used. The low layer compatibility IEs 308 are utilized by physical layer, link manager, and network layer as illustrated in FIG. 4; whereas, higher layer compatibility IEs 309 are utilized by software layers above network layer 404 of FIG. 4. To understand the relationship between the layer capabilities IEs and the bearer capability IEs, consider the following example. If a user wishes to set up a data packet connection utilizing LAPF protocol, from communication terminal 101 to communication terminal 104 the user can do this using two methods. The first method is to specify in the bearer capability that a LAPF packet connection is to be set up. In this case, it is not necessary to include any information in the lower layer capability IEs 308 and may not be necessary to include any information in the higher layer capabilities 309. The switch nodes are responsive to the bearer capabilities to set up the packet switching connection in the most convenient manner. In general, the switch node will set up this packet connection as a packet connection rather than as a circuit connection. In the second example, the user wishes to have a 64 Kb circuit connection set up through switching nodes 102 and 103 and only implement the LAPF protocol at the endpoints, communication terminals 101 and 104. In this case, communication terminal 101 would request in the bearer capability 305 of the transport message a 64 Kbs per second circuit switch connection. The transport message then would include in the lower layer capability of IEs 308 the fact that this is to be a packized data connection utilizing the LAPF protocol. In this manner, the packetized connection is guaranteed to have a predictable transmission time through switching nodes 102 and 103. In addition, the purpose may be to run a proprietary packet protocol on the circuit switch 64 Kbs data connection through switch nodes 102 and 103. Higher layer capability IEs 309 define to presentation layer 407 of FIG. 4 the high layer protocols that are to be used with information being received by the network layer. Presentation layer 407 conditions messages for use by the applications in applications layer 409 of FIG. 4. Examples of the types of protocols that presentation layer 407 may operate with are: X400 email standard, g4 fax standard, file transfer, or screen sharing standard. As can be easily seen, these higher level protocols are of no concern to the intervening switching nodes 102 and 103.

The transport acknowledge message, TRANS_ACK 310 is illustrated in FIG. 3. IEs 311, 312, 314 have identical functions to those described for IEs 301, 302, and 304. Message type IE 313 is set equal to TRANS_ACK. Upon receiving a transport message, a switch node within the network responds with a transport acknowledge message. If the receiving switching node can provide all of the transport capabilities requested in IEs 305, 306, and 307, the transport acknowledge message only consists of IEs 311–314. If the receiving switching node cannot provide a particular transport capability, that transport capability is defined in IEs 315 and 316 or IEs 317 and 316. For example, if the transport message has requested video transport which the receiving switching node cannot provide, then the video capability is specified in IEs 315 and 316 of the transport acknowledge message. Display IE 319 may define the reasons why this capability is not provided. If the sending switching node does not wish to accept the reduction of transport capabilities, the sending switching node's only option is to abandon the transport message request. Once again, call reference IE 312 defines which call the transport acknowledge message is associated with.

The transport complete message, TRANS_COM 320 is also illustrated in FIG. 3. The transport complete message is utilized to define to each switching node that is communicating the call the resulting transportation capabilities that have been added, removed, or changed with respect to the call. If all switching networks in the call path have accepted the requested transport capability, the transport complete message consists only of IEs 321–324. If one or more of the requested transport capabilities cannot be provided those capabilities are defined in IEs 325, 326, and 327. Each switching node in the call path retains a record of any transport capability that it may have eliminated from the receive transport message and includes this eliminated transport capability in the transport complete message. The result is that when the originating endpoint receives the transport complete message that message defines to the originating endpoint what the transport capability of the call is. Also, as intervening switching network nodes receive the transport complete message they eliminate transport capability that they had agreed to provide for the call if that transport capability is not present in the transport complete message.

Transport reject message, TRANS_REJ 330 is utilized to reject a transport message. IEs 331–333 and 339 are identical in function to IEs 301–303 and 341 of the transport message. IE 334 defines the reason why the transport message is being rejected.

FIG. 4 illustrates the software architecture of the switching nodes of FIG. 1. This architecture is based on the conventional OSI model modified to implement the ISDN protocol. In accordance with the invention as described herein, certain further modifications have been made to the standard model in order to include ISDN capabilities.

The principal function of physical layer 401 is to terminate physical links. Specifically, physical layer 401 is responsible for maintaining physical channels and for controlling physical subchannels thereon. Physical layer 401 comprises a software portion and physical interfaces. Further, the software portion of physical layer 401 is responsible for the direct control of the physical interfaces to which physical links communicating PRI and BRI information terminate. Physical layer 401 presents to link layer 412 physical subchannels and physical channels as entities controllable by link layer 412.

The primary function of link layer 412 is to assure that the information transmitted over a physical channel is recovered intact and in the correct order. This is accomplished using another layer of protocol which allows multiple communication paths—commonly referred to as logical links—to be established on a given physical channel or a physical subchannel communicating packetized data. These logical links are used to identify and process data being communicated between link layer 412 and physical layer 401. (An example of this type of protocol is the LAPD packet protocol used in ISDN Q.921. In the ISDN standard, link layer 412 terminates the LAPD protocol.) Link layer 412 can support multiple protocols so that the upper layers are uneffected by the different protocols being utilized. Further, link layer 412 allows higher software layers to control physical layer 401 in an abstract manner.

As seen in FIG. 4, link layer 412 is divided into link interface 402 and link management 403. The reason for this division is set forth herein below. It will be helpful at this point to discuss the communication of ISDN signals over a D channel to help readers, for example, who have only a rudimentary knowledge of the communication of ISDN signals over a D channel. At link layer 412, a plurality of logical links is established on a D channel. Only one of these logical links communicates ISDN control signals, and this logical link is referred to herein as a logical D channel (LDC). The LDC is identified by a logical D channel number (LDCN).

Link interface 402 does the majority of the functions performed by link layer 412, including the establishment of the logical links. Link management 403 identifies the various link interfaces for higher software layers. Further, link management communicates information between the logical links and higher software layers.

Network layer 404 processes information communicated on the LDCs, and thereby terminates the ISDN Q.931 protocol. Hence, this layer is responsible for negotiating the utilization of system resources for the termination or origination of calls external to a switching node. The network layer controls the allocation of channels on an interface on which a call is being received or set up. For example, if communication terminal 101 receives a call from switching node 102 via PRI link 150, network layer 404 of communication terminal 101 negotiates with its peer layer (the corresponding network layer 404 in switching node 102) in order to obtain allocation of a B channel in PRI link 150—a procedure later to be repeated if a second B channel is desired. This negotiation is carded out using standard ISDN Q.931 messages such as the call setup and connection messages via the LDC setup on the D channel of PRI link 150. Network layer 404 identifies all B channels of given interface with the LDC for that interface. Network layer 404 is only concerned with the establishment of a call from one point to another point (e.g., switching node to switching node). The network layer is not concerned with how a call is routed internally to a particular switching node but rather transfers information up to higher layers for the determination of how a call is routed in the switching node. However, the network layer does request that one application, referred to here and below as the connection manager application, add or remove facilities on a physical interface to a switch connection within a switching node.

Specifically, the network layer carries out call setup by first determining that the request for the establishment of a call is valid and that the resources between the two switching systems are available to handle this call. After this determination, information concerning the call is transferred to higher software layers. The reverse is true when the network layer receives a request from the higher software layers to establish a connection with another switching node.

Network layer 404 receives information from another node concerning a call via a LDC. As information is received on the LDC, a call reference number is utilized to identify the call associated with this message. The call reference number is selected by the originating network layer during call setup in accordance with the ISDN standard. Details of this identification are given with respect to FIG. 14.

Transport layer 405, is the key element that allows the routing of a call through a complex system having multiple nodes as illustrated in FIG. 1. Its primary function is to manage the routing of calls externally, i.e., between switching nodes. Transport layer 405 views the system of FIG. 1 in terms of nodes and is concerned with routing calls from its own node to other nodes or endpoints. (As explained in the detailed discussion of session layer 406, that layer, not transport layer 405, interprets logical destination information, such as a telephone number, to determine the destination node of a call and to establish an intra-node path by using the connection manager application.) In an overall system comprising multiple switching nodes such as communication terminal 101, the various transport layers communicate with each other in order to establish a call through the various switching nodes. This communication between transport layers is necessary because it may be necessary to route the call through intervening nodes to reach the destination node. The transport layers communicate among themselves utilizing signaling paths (LDCs) established between switching nodes.

With respect to inter-node routing, transport layer 405 is the first layer that starts to take a global view of the overall system illustrated in FIG. 1. Transport layer 405 uses information provided by session layer 406 to select the inter-node path. The transport layer performs its task of routing between various nodes by the utilization of tables defining the available paths and the options on those paths. These tables do not define all paths but only those paths which the node has already used.

Communication between transport layers is done by network layer 404 using established LDCs. Transport layer 405 communicates information destined for its peers to network layer 404, and network layer 404 packages this information within the information elements, IEs, of standard ISDN Q.931 messages. Network layer 404 uses the LDC that has been set up to a particular node to communicate this information to its peer network layer. Similarly, when another network layer receives information of this type, the other network layer unpackages information and then directs the information to the transport layer.

The primary function of session layer 406 is to establish communication among endpoints with all endpoints considered to be applications including, for example, a BRI station set is considered an application. Significantly, these endpoints may be applications such as the TMA applications. In any event, connections between such endpoints is considered a call. A session (call) is set up by session layer 406 any time two applications require communication with each other. As noted earlier, session layer 406 deals only in terms of switching nodes and applications on those switching nodes and relies on transport layer 405 to establish paths to other switching nodes. Session layer 406 identifies the called application by an address which previously in the telecommunication art was thought of as only a telephone number but has a much broader concept in the Q.931 protocol. From this address, session layer 406 determines the destination switching node. Session layer 406 sets up a call to the destination switching node by communicating with the session layer of the destination switching node. The communication with the other session layer is accomplished by having the session layer request its transport layer to place a call to the other switching node so that a connection can be made for a particular address. The transport layer places the call relying on the node number that was determined by the session layer. These requests are done using the network layer to generate standard ISDN Q.931 call setup messages. If the other switching node cannot interpret the address, the session layer of that switching node transmits information to its transport layer requesting that the call be dropped. If the session layer can interpret the address, it sends a message to its transport layer requesting that a call proceeding message be transmitted by its network layer back to the requesting switching node.

Presentation layer 407 of FIG. 4 invokes a complex protocol in order to groom the information being communicated between applications so that the applications are totally divorced from the protocol used to communicate the information. A presentation level protocol allows an application to communicate with a peer application across a transport path.

Finally, application layer 408 manages the resources needed by the applications running at software layer 409. When an application at software layer 409 is communicating with another peer application, the application is unaware of how many other applications exist or where these other applications are located. It is the function of application layer 408 to determine and use such details, consequently allowing the applications to be written in a very abstract manner.

Layer management 413 provides for communication between the various software layers of FIG. 4. For example, when the connection manager which is at applications layer 409 requests that connection be made in the physical networks these requests are communicated via layer management 413. Management information base 414 stores various tables and records used be the software layers. For example, the call and session records which will be described shortly are stored in management information base 414. Management information base 414 allows the a software layer to access a record maintained by another software layer.

Further information on the operation and software structure of layers 401 through 409 is given in U.S. Pat. No. 5,386,466.

Figure 5:
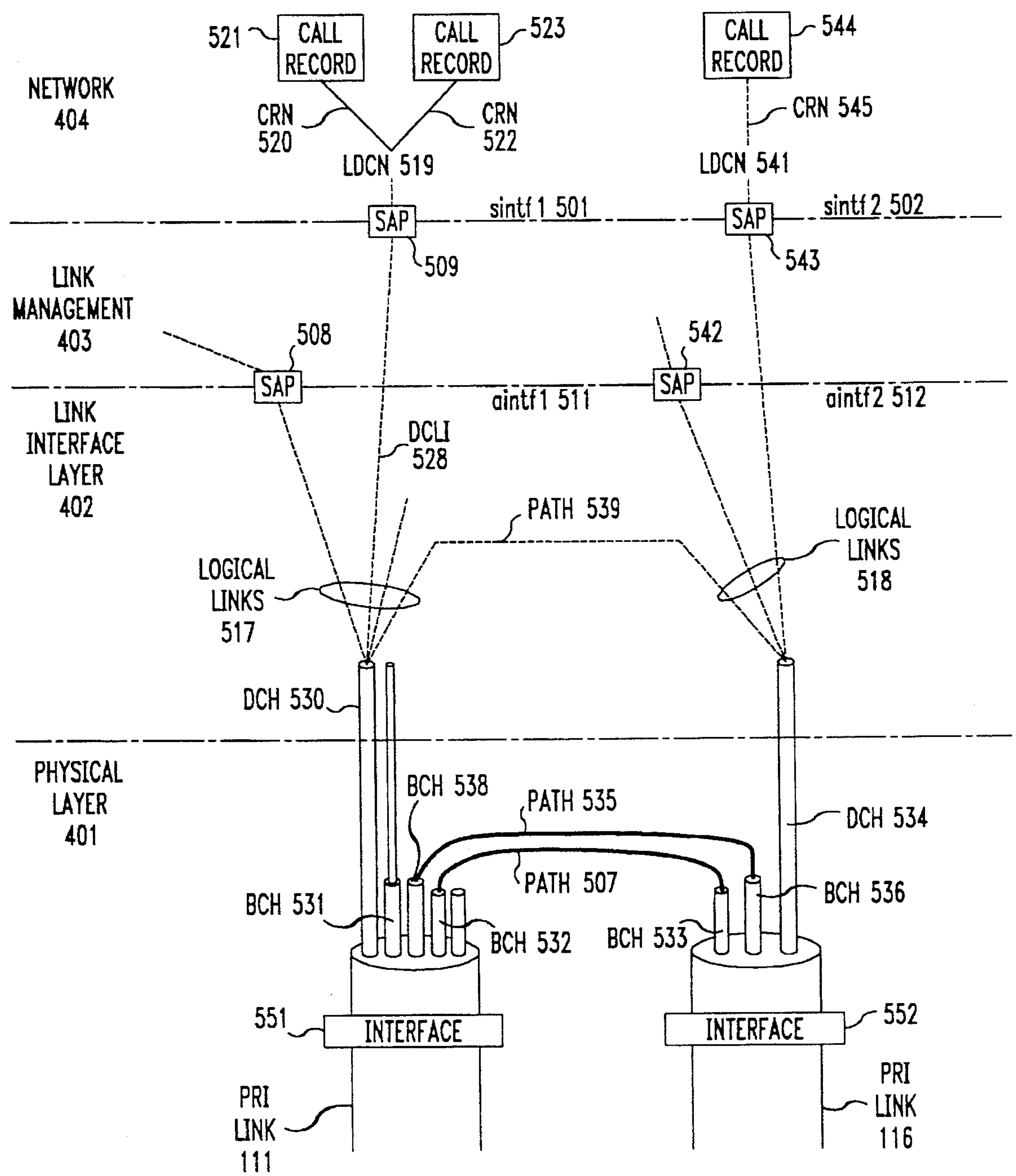
FIG. 5 logically illustrates the signaling and transport paths that are set up within a switch node.

FIG. 5 logically illustrates the general relationships between data link connection identifiers (DLCI), service access point identifiers (SAPI), terminal end identifiers (TEI), system interlace numbers (sintf), switches angel interface numbers (aintf), logical D channel numbers (LDCN), call reference numbers (CRN), and the various software layers. As illustrated in FIG. 5, the pair of link interface layers and physical layers are implemented on an angel. (The concept of angels is explained in U.S. Pat. No. 5,386,466.) Link interface layer 402 and physical layer 401 are implemented by a local angel. A node processor in switch node 102 implements link management 403, network 404, and higher layers. The node processor provides overall control of switch node 102. Sintf, switch and aintf numbers correlate to physical interfaces. The sintf numbers are utilized by network software layer 404 and higher software layers to identify physical interfaces. In addition, two switching nodes, interconnected by a link that is terminated on both ends by a physical interface, negotiate a logical interface number for the link during initialization of the link.

When a transport message is received, network layer 404 converts the logical interface numbers in the channel identification IEs to sintf's. Network layer 404 views the physical interfaces as being identified by sintfl 501 and 502. Link management 403 makes a conversion between the sintf numbers and the switch and aintf numbers which together represent the physical interface. For example, link management 403 converts sintfl 501 to the local angel and aintf 511. Link interface layer 402 utilizes aintf 1511 to identify physical interface 551. There is a one for one correspondence between sintfl 501 and sintf2 502 and aintfl 511 and aintf2 512.

The sintf and aintf numbers identify specific interfaces, and each interface has a number of channels. For example, PRI interfaces 551 and 552 each have 24 channels. Network layer 404 identifies the channels associated with a particular sintf by using the actual physical channel numbers, and similarly, link interface layer 402 utilizes the physical channel numbers in association with an aintf number. This is possible because the specifications of the ISDN standard designate that physical channel 24 is used to perform signaling. Network layer 404 and higher layers utilize sintf numbers in order to control the link interface layers and physical layers to interconnect physical channels and to create specific protocols on these channels. The manner in which B channels are interconnected through physical networks such as network 515 is not illustrated in FIG. 5 except in a logical manner, e.g. path 507.

Further, FIG. 5 logically illustrates the utilization of the various channels and the points at which these channels are terminated and at which information is utilized. B channel 532 of interface 551 is interconnected to B channel 533 of interface 552 by path 507. Path 507 is made through a network internal to a switch node. It would be obvious to one skilled in the art that similar paths could be made between B channels in interface 551 and 552. The circuit switching of B channels is performed at the physical layer; whereas, packet switching or frame relaying is performed at the link interface layer. Greater detail on operations of the layers of FIGS. 5 and 6 in setting up a call are set forth in U.S. Pat. No. 5,386,466.

This section describes the transport messages from the prospective of applications software layer 409, session software layer 406, transport software layer 405, and network software layer 404 through switch node 102. To clarify the explanation, first a brief description is given of how a call is initially set up through switch node 102.

Figure 6:
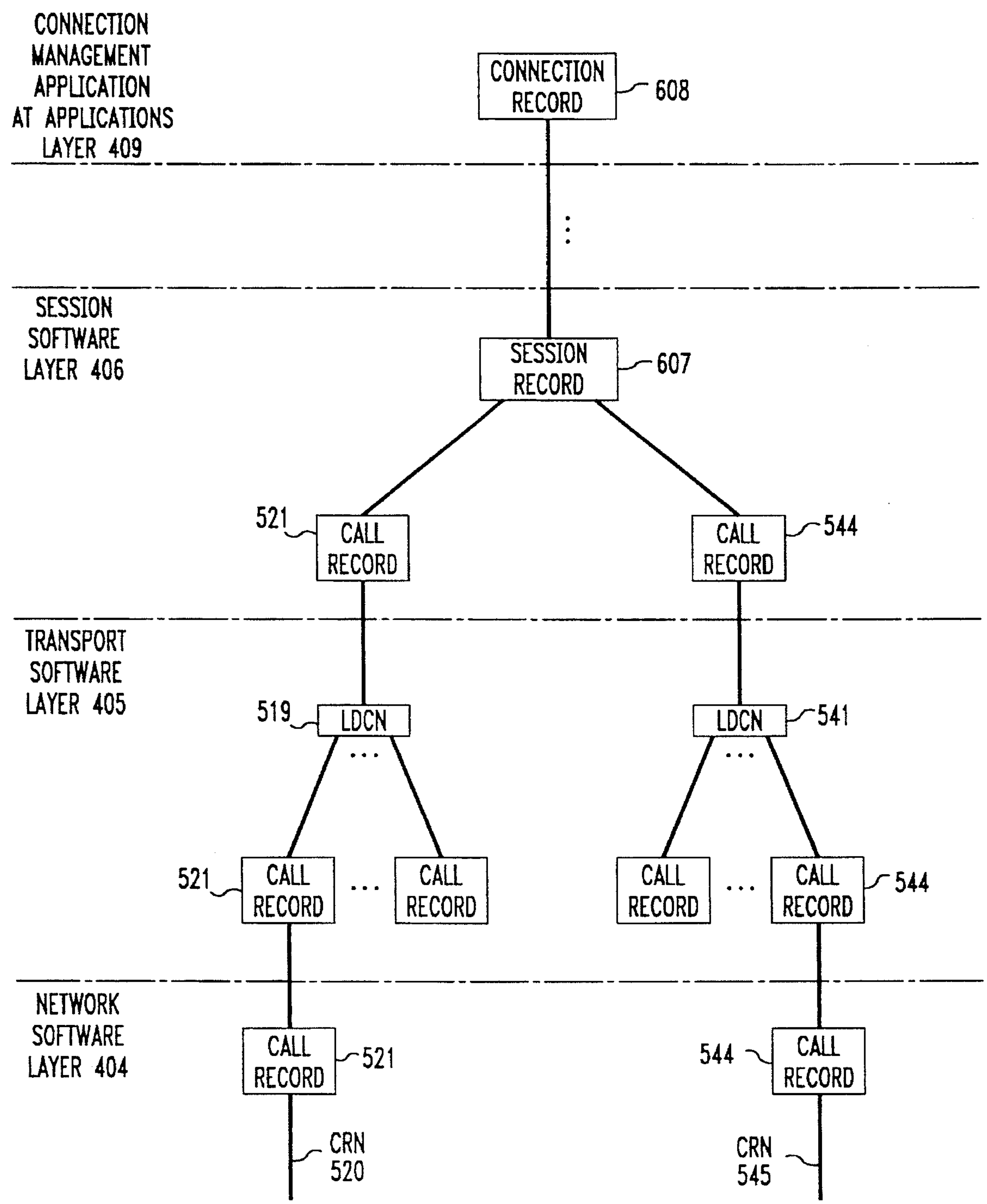
FIG. 6 illustrates the logical structure of a call through the network, transport, session, and application software layers.

FIG. 6 illustrates the manner in which calls are identified and processed between network software layer 404, transport software layer 405, session software layer 406, and applications software layer 409. Switching node 102 is executing these software layers. At network software layer 404, each half of a call is identified by the CRN number, e.g. CRN 520, and a call record, e.g., call record 521, as previously described with respect to FIG. 5. As can be seen from FIG. 6, the call record is common throughout the software layers, and each layer uses additional information along with the call record. The call records are taken from a common table within each switching node, and a call record number is unique within a particular switching node.

Transport software layer 405 identifies each half of a call by the LDCN and call record number. The LDCN is utilized because the information illustrated in the level 4 routing tables is identified by the LDCN number which denotes the link (or set of links) out of a switching node to another switching node. Notice that the call record is identified identically at all three software layers as illustrated in FIG. 6 for a particular call. Session software layer 406 is the point within the software architecture where halfs of calls are joined together for purposes of exchanging signal information by each call having a unique session record set up for it such as session 607. The session record is associated with two call records such as call record 521 and call record 544 with each call record representing half of a call. (Each half of a call is referred to as a "half call".) An exception to this rule is if the call is to an application. In that case, only one call record is utilized since the other half of the call terminates at the application software layer.

To understand how calls are processed by the three software layers illustrated in FIG. 6, first consider the example of setting up a call through switch node 102. For this example, reference must be made to FIG. 5 which illustrates the interfaces associated with call records 521 and 544. Call record 521 is associated with PRI link 111, and call record 544 is associated with PRI link 116 in the following example.

Assume that a call is being placed from communication terminal 101 to communication terminal 104 via switching node 102. LDCN 541 is associated with PRI 116 which interconnects switching node 102 to switching node 103 as illustrated in FIG. 1. Further, assume that the node number in the setup messages designates communication terminal 104. (The manner in which routing decisions are made in switch node 102 for a call from communication terminal 101 to communication terminal 104 is set forth in U.S. Pat. No. 5,386,466.) When the setup message is received from communication terminal 101 via PRI link 111, network software layer 404 generates a setup indication which is communicated to transport software layer 405 and establishes call record 521 which starts the setting up of the first half call. Transport software layer 405 examines the node number and determines that switching node 102 is not the destination switching node; hence, layer 406 does not set a node flag. If the node flag was set, this indicates that the call terminates on switch node 102. The dialed number along with the node flag is communicated to session software layer 406 which, because the node flag is not set, does not attempt to route a call based on the dialed number. Since in the present example the node flag is not set, session software layer 406 establishes session record 607 and call record 544 is selected which starts the setting up of the second half call. The node and the call record number are then communicated to transport software layer 405 as a setup request. Transport software layer 405 interrogates the level 4 routing table and determines that LDCN 541 is a path to communication terminal 104. Transport software layer 405 then associates call record 544 with LDCN 541 and transmits the setup request to network software layer 404 which then establishes communication with switching node 103 via PRI link 116.

After switch node 102 has sent a setup message to switch node 103 via PRI link 116, the network software layer of switch node 103 responds with a call proceeding. Network software layer 404 is responsive to the call proceeding message to notify a connection manager that it should establish the connection through switch node 102 switching network to interconnect B channel 532 and B channel 533 so as to establish path 507. Session record 607 points to connection record 608. Connection record 608 is maintained by the connection manager which is executing at applications layer 409. The connection manager is responsive to the message from network software layer 404 to establish this connection and to enter into connection record 607 the parameters of the internal connection.

To further understand how the transport messages are utilized to increase or decrease bandwidth through switch node 102, consider the following example. Assume that the setup message that was described in the previous paragraph setup a voice connection through switch node 102 which resulted in path 507 of FIG. 5 being set up through the switching network of switch node 102. Next, communication terminal 101 requests that a packet switch connection be established on D channel 530 and that a 64 Kb data channel be established on channel 538 by using a transport message.

In order to establish the additional bandwidth necessary for the data link executing the LAPF protocol and a data channel having 64 Kbs, communication terminal 101 transmits to switch node 102 a transport message that has the following information. Call reference IE 302 is set equal to CRN 520 of FIGS. 5 and 6, message type IE 303 is set equal to TRANS. Repeat indicator IE 304 is set to add bandwidth. Bearer capability IEs 305 are as follows. The first bearer capability IE specifies a packet data link using the LAPD protocol, and the second IE is set equal to a circuit data link with 64 Kbs of bandwidth. Channel identification IEs 306 are as follows. The first IE specifies interface 551 utilizing the logical interface number, and specifies the use of D channel 530. The second IE of the channel identification IEs 306 specifies interface 551 and B channel 538. A single data link identification IE 307 follows and specifies that one of the logical links 517 is to be used for packet data. Lower layer capability IE 308 specifies the proprietary protocol that communication terminal 104 is to implement with respect to the 64 Kb data channel. Higher layer compatibility IE 309 specifies that the X400 email protocol standard is being implemented. This transport message is received and disassembled by network software layer 404 of FIG. 6. If network software layer 404 is capable of providing the requested transport capabilities, network transport layer 404 responds with a transport acknowledge message that contains only IEs 311, 312, 313, and 319. If network 404 cannot provide one of the requested transport capabilities, it identifies the particular transport capability that could not be provided in IEs 315, 316, and 317, and indicates in the repeat indicator 314 that this particular transport capability must be deleted. In addition, the transport acknowledge message could also indicate using another bearer capability, channel identification, and data link identification IEs, as an alternative to what had been requested.

In the present example, network software layer 404 can provide the requested transport capabilities. Network software layer 404 then transmits to session software layer 406 via LDCN 519 of transport software layer 405 the request to add transport capabilities. Session software layer 406 utilizes session record 607 to call record 544 to determine that the call utilizes LDCN 541 and uses LDCN 541 to notify network software layer 404 that additional work is to be done with respect to call record 544.

Returning for a moment to the left half of the call that is illustrated by call record 521 and LDCN 519 of FIG. 6. Network software layer 404 transmits to the connection manager the new parameters that have been added to the connection identified by call record 521. The connection manager is responsive to this information to store the additional connection information in connection record 608.

In the right half of the call that is identified by call record 544 and LDCN 541, network software layer 404 is responsive to the bearer capability IEs of the message that has been received from communication terminal 101 to determine which transport facilities should be utilized to meet the requirements of these bearer capability IEs. As illustrated in FIG. 5, network software layer 404 utilizes one of the logical links of logical links 518 to provide the data link utilizing the LAPD protocol and B channel 536 to provide the capabilities of the 64 Kb data channel. Note, if network software layer 404 had available a B channel which had been subdivided into logical links, network software layer 404 could have used one of these logical links for the data link executing the LAPF protocol. Network software layer 404 now forms a transport message that includes the bearer capability IEs that are identical to those received from communication terminal 101 and channel identification IEs 306 and data link identification IEs 307 that are specific to the transport capabilities being utilized with interface 552. The lower layer compatibility IEs 308 and higher layer compatibility IEs 309 are simply transported up the left half of the call to session software layer 406 which then transmits them down the right half of the call where they are assembled into the transport message by network software layer 404. Network software layer 404 then transmits the transport message to its peer network software layer in switch node 103.

In our present example, the network software layer in switch node 103 accepts all of the transport capabilities requested in the transport message. The network software layer in switch node 103 responds with a transport acknowledge message which contains no IEs 315, 316, or 317. Network software layer 404 in switch node 102 is responsive to this transport acknowledge message to transmit to the connection manager in application layers 409 of FIG. 6 the parameters for the left half of the call so that these can be stored in the connection record 608. The connection manager is also responsive to this information to control the switching network of switch node 102 to setup path 535. In addition, connection manager transmits a message to link interface layer 402 to setup path 539.

At this point, paths 507, 535, and 539 are set up through switch node 102. In the present example, when switch node 103 attempts to establish the original transport capabilities, communication terminal 104 is unable to provide the data link utilizing the LAPD protocol. The result is that switch node 103 in the left half of the call which is similar to that illustrated in FIG. 6 has recorded in its connection record the voice bandwidth, the data link using LAPD protocol, and the 64 Kb data channel. However, in the connection record for the right half of the call, only the voice call and the 64 Kb data link are recorded. Upon receiving the transport complete message from communication terminal 104, via network software layer, the connection manager in switch node 103 only connects the 64 Kb data link. Note, that the voice call connection was made during the setup process. Communication terminal 104 then transmits a transport complete message that identifies the bearer capability, channel identification IEs, and data link identification IEs that are in use. This message is received by switch node 103 and is transferred up the right half of the call through the software layers to session software layer 406 of switch node 103 which communicates it down the left half of the call to network software layer 404 of switch node 103. Network software layer 404 eliminates the data link capabilities and informs the connection manager that the data link is no longer being utilized. In response, connection manager of switch node 103 eliminates the data link information from connection record of switch node 103. Network software layer 404 in switch node 103 then assembles a transport complete message that details the fact that only the 64 Kb data link has been set up and transmits this transport complete message to switch node 102.

When network software layer 404 of switch node 102 receives the transport complete message from switch node 103, it informs the connection manager that path 539 is to be eliminated. The connection manager then eliminates from connection record 608 reference to the data link executing the LAPD protocol. Network layer 404 then transmits the transport complete message through session software layer 406 down into the left half of the call. Network software layer 404 is responsive to this transport complete message to notify the connection manager to eliminate the reference to the data link executing the LAPD protocol from connection record 608. The connection manager also transmits a message to link interface layer 402 to remove path 539. In the left half of the call, network software layer 404 then assembles another transport complete message for transmission to communication terminal 101.

At a later point in time, communication terminal 101 determines that the 64 Kb data link is no longer required, communication terminal 101 transmits a transport message where repeat indicator 304 is set equal to remove and the bearer capability IEs 305, channel identification IEs 306, and data link identification IEs 307 specify that the 64 Kb data link is to be removed. Switch node 102 then repeats this message and sends it to switch node 103. Upon receiving the transfer acknowledge message back from switch node 103, network software layer 404 requests that the connection manager remove path 535. In addition, connection manager updates the connection record 608 as requested by network software layer 404. When the transport message requesting the removal of the data link is received by communication terminal 104, it responds with a transport complete message that specifies that this removal should have taken place.

Returning now to when communication terminal 104 received the transport message that set up the 64 Kb data channel, communication terminal 104 responds in a similar manner with respect to IEs 305 through 307 as the other switch nodes did. The termination point of a call is a terminal management application that is executed in applications level 409 of FIG. 4. Greater details on the functions of a terminal management application are given in U.S. Pat. No. 5,182,751 and U.S. Pat. No. 5,386,466. Briefly, a terminal management application provides all of the control functions required to terminate a call and to allow the terminal to utilize the communicated data. A terminal management application can be executed on a switch node whereby the majority of the terminal control functions are done in the switch node rather than within the communication terminal. On the other hand, a communication terminal, such as communication terminal 101, does have its own computer and is executing the software structure illustrated in FIG. 4. In this case, the terminal management application is executing on the terminal. As illustrated in FIG. 1, communication terminal 101 is then the termination point of the call. However, with a different type of communication terminal being utilized for communication terminal 101, the terminal management application could be executing in switch node 102 which would be the termination point of the call.

When the transport message was received to set up the 64 Kb data channel, this message was transported to the terminal management application at applications level 409. The terminal management application then requested that the connection manager request that link interface layer 402 implement the proprietary protocol that is defined in the low layer compatibility IEs 308 so that the link interface layer can properly use the low level proprietary protocol. In addition, the connection manager application instructs the presentation layer 407 of communication terminal 104 to implement the X400 email standard as defined in by the higher layer compatibility IE 309.

Figure 7:
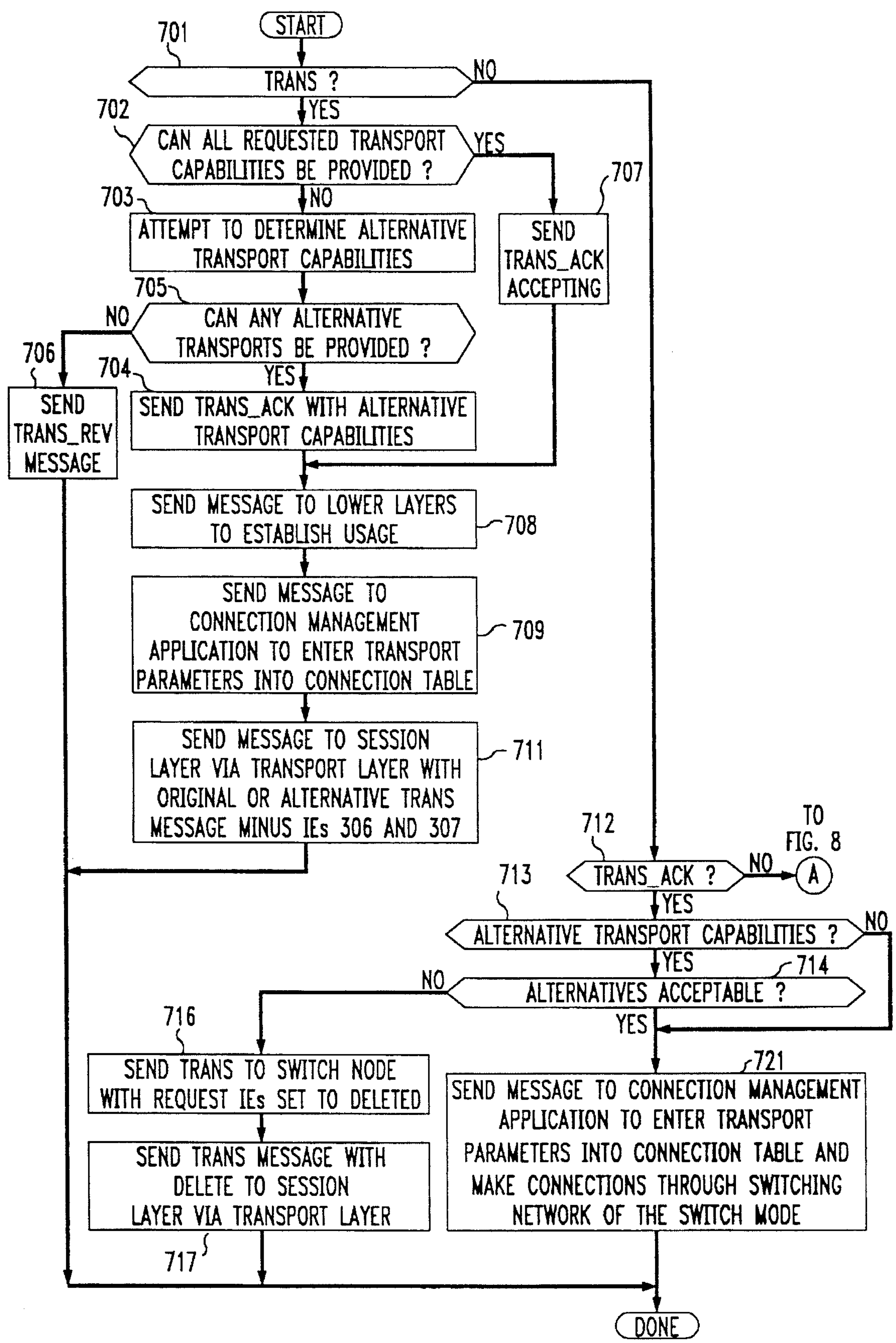

FIGS. 7, 8, and 9 illustrate, in flowchart form, the operations performed by network software layer 404 in implementing the transport messages illustrated in FIG. 3. Network software layer 404 performs the majority of the work in implementing the transport messages. FIGS. 7 and 8 illustrate the responses of network layer 404 upon receiving a transport message from another switching node. FIG. 9 illustrates the responses of network software layer 404 upon receiving a transport message from the session layer 406. The convention used in these figures is that that transport messages being received or sent to another switch node are identified only by their message code, e.g., TRANS. On the other hand, transport messages being relayed by session software layer 406 from the other half of the call are designated by the message code and the word "message", e.g., TRANS message.

Decision block 701 of FIG. 7 determines whether a TRANS message has been received from another switch node. In the previous example, switch node 102 receives a TRANS message via interface 551 from communication terminal 101. If the answer in decision block 701 is yes, decision block 702 determines whether the requested transport capabilities that are defined by bearer capability IEs 305, channel identification IEs 306, and data link identification IEs 307 can be provided. If the transport capabilities can be provided, block 707 is executed which sends back a TRANS_ACK message that contains no IEs 315, 316, and 317. If the answer in decision block 702 is no, block 703 attempts to determine an alternative transport capability. If none of the transport capabilities can be provided, a TRANS_REJ message is sent and all further processing is terminated. If at least one original or alternative transport capability can be provided, a TRANS_ACJ message is returned with the modified list of transport capabilities. Next, block 709 sends a message to the connection manager at applications layer 409 requesting that the transport parameters as defined by the transport capabilities be entered into connection table 608. The transport parameters entered are either those of the originally requested transport capabilities or the alternative transport capabilities or the resulting combination of the two. Finally, block 711 sends a TRANS message to session layer 406 via transport layer 405 which is the original TRANS message and/or alternative transport capabilities minus IEs 306 and 307. IEs 306 and 307 are unique to the left half of the call as illustrated in FIG. 6. Session software layer 406 is responsive to this message to identify the call record, to identify LDCN associated with the right half of the call, and to send the message down the right half of the call with the proper identification to network software layer 404.

Returning to decision block 701, if the answer is no, control is transferred to decision block 712 which determines if a TRANS_ACK message was received from another switch node. In the previous example, a TRANS_ACK message was received by switch node 102 from switch node 103 on interface 552. This TRANS_ACK message was received by the right half of the call. If the answer in decision block 712 is yes, control is transferred to decision block 713. The latter decision block determines if there are alternative transport capabilities in the transport acknowledge message. If the answer is yes, control is transferred to decision block 714 which determines if the alternative transport capabilities are acceptable, i.e., the switch node can provide the alternative transport capabilities. If the answer in decision block 714 is no, block 716 is executed which sends a TRANS message to the other switch node with a request to delete any transport capabilities that are not acceptable. Next, block 717 sends a TRANS message with the same delete request included to session software layer 406 via transport layer 405. Session layer 406 is responsive to that message to transport the message down the left half of the call to network software layer 404. Note, that the transport parameters are only inserted into the connection record and paths established within a switch node upon reception of an acceptable TRANS_ACK message.

Returning to decision blocks 713 and 714. If the answer in decision block 713 is no, or the answer in decision block 714 is yes, control is transferred to block 721 which sends a message to the connection manager to enter the transport parameters into the connection table and to make the connections through the internal switching network of the switch node.

Returning to decision block 712, if the message is not a TRANS_ACK message, control is transferred to decision block 801 of FIG. 8 which determines if the message is a TRANS_REJ message. If the answer in decision block 801 is yes, block 802 sends a message to the connection manager to remove the transport parameters from the connection table and to remove any paths having been set up for those transport parameters through the switching network of the switch node. Note, that there may not be any work for the connection manager to do if the TRANS_REJ message is received in place of a TRANS_ACK. After execution of block 802, block 803 sets a message containing the TRANS_REJ message to session layer 406 via transport layer 405. Session software layer 406 sends this message down the left half of the call with the proper call record and LDCN identification information to network software layer 404.

If the answer in decision block 801 is no, control is transferred to decision block 804 which determines if the message is a TRANS_COM message. If the answer is no, control is transferred to block 808 which provides normal processing. Block 808 handles the standard ISDN messages. If the answer is yes in decision block 804, block 806 determines which transport parameters that are in connection table 608 are not identified by the bearer capability IEs 325, channel identification IEs 326, and data link identification IEs 327. After identifying these transport parameters, block 806 transmits a message to the connection manager to remove these transport parameters and any associated paths. Finally, block 807 sends a message to session software layer 406 via transport software layer 405 that contains the original TRANS_COM minus the channel identification IE 326 and the data link identification IE 327. Session software layer 406 is responsive to that message communicated down the left half of the call to network software layer 404 with the call record and LDCN identification information.

FIG. 9 illustrates the operations performed by network software layer 404 in response to transport messages being received from session software layer 406. Decision block 901 determines if the message is a TRANS message. In the previous example, the fight half of the call illustrated in FIG. 6 receives a TRANS message from session software layer 406 after the left half of the call had received that message from communication terminal 101 via interface 551. If the answer is yes in decision block 901, control is transferred to block 902. Block 902 is responsive to the bearer capability IEs 305 to determine what the new channel identification IE 306 and data link identification IEs 307 should be for the TRANS message that will be transmitted to the next switch node. After this determination is made, block 903 forms and sends the new TRANS message to the next switch node. Note, that elements 301, 302, 303, 304, 305, and 308, 309, and 341 are simply repeated in the new TRANS message.

If the answer in decision block 901 was no, decision block 904 determines if the message received from session software layer 406 is a TRANS_COM message. If the answer in decision block 904 is yes, decision block 906 determines the transport parameters that are in connection table 608 that are not identified in bearer capability IEs 325, channel identification IEs 3216, and data link identification IE 327. After determining these transport parameters, block 906 transmits a message to the connection manager requesting that these transport parameters be removed from the connection table 608 and that all associated paths be removed. Next, block 907 forms a TRANS_COM message with new channel identification IEs 326 and data link identification IEs 327 that define the transport capabilities on the left half of the call. Block 907 then sends the formed TRANS_COM message to the other switch node.

If the answer in decision block 904 is no, control is transferred to decision block 908 which determines if a TRANS_REJ message was received from session software layer 406. If the answer is no, control is transferred to block 909 for normal processing of standard ISDN messages. If the answer in decision block 908 is yes, block 911 sends a message to the connection manager to remove all parameters entered into connection table 608 by the associated TRANS message. Finally, block 912 sends a TRANS_REJ message to the next switch node. In the previous example, block 912 sends the TRANS_REJ message from switch node 102 to communication terminal 101.

Figure 10:
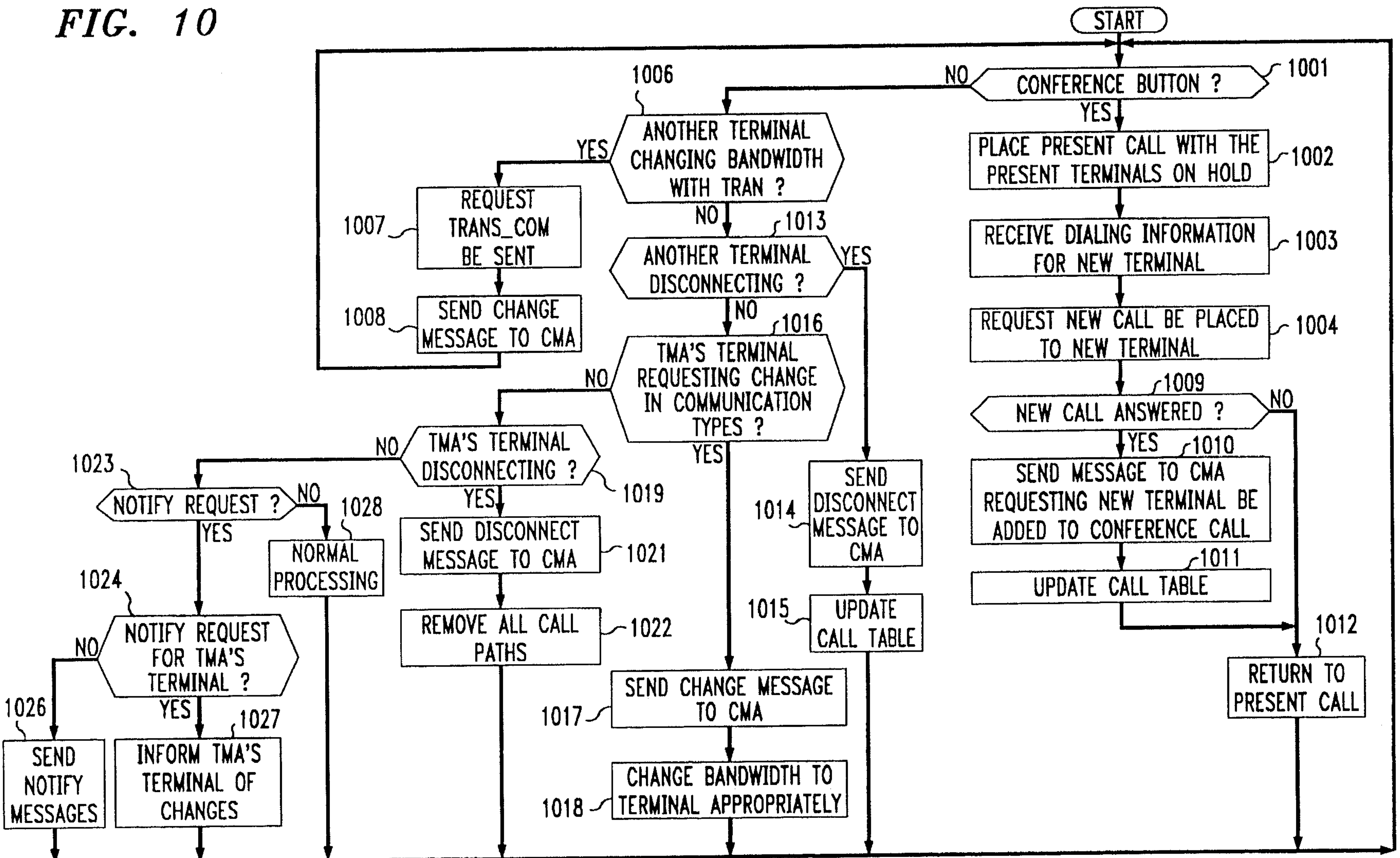
FIGS. 10 illustrates, in flow chart form, operations performed by terminal management application.
Figures 12, 13, 16:
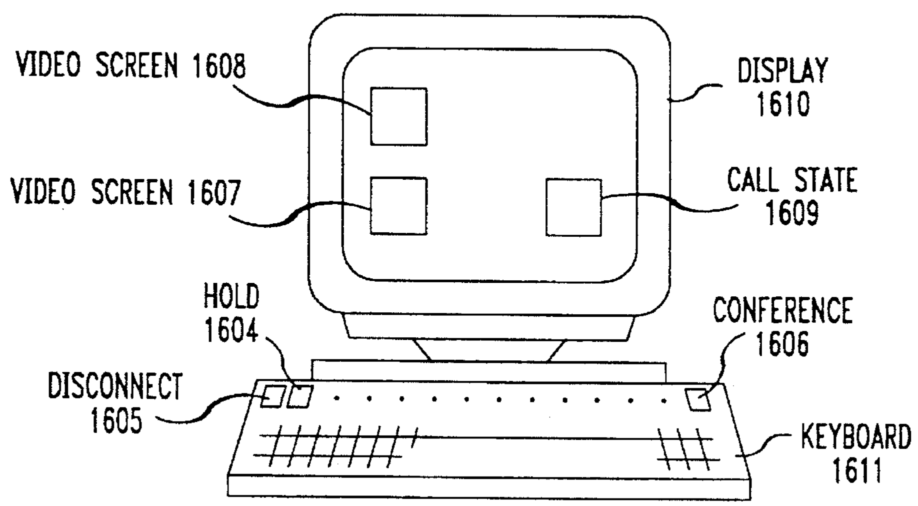
FIG. 12 illustrates a conference table.
FIG. 13 illustrates a call table.
FIG. 16 illustrates a communication terminal in accordance with the inventive concepts.

Greater details on the functions performed by CMA 127 and TMA 128 are illustrated in FIGS. 11 and 10, respectively. During the multimedia conference call, all messages transmitted to communication terminal 106 are received by TMA 128 of FIG. 1. TMA 128 then responds to these messages by sending the proper reply message, transferring information to CMA 127, and controlling the operation of communication terminal 106. CMA 127 has overall control of the multimedia conference call but exercises this control by requesting TMA 128 transmit messages to the other communication terminals on the conference call. In addition, CMA 127 controls the internal networks of switch node 101 by sending requests to CM 129. FIG. 10 illustrates the operations of TMA 128. Decision block 1001 determines if the conference button has been activated on communication terminal 106 indicating the desire to initiate a conference or to add another terminal to the conference. If the answer to decision block 1001 is yes, block 1002 places the present call with the present terminals on hold. Note, that if communication terminal 106 is only engaged in a multimedia call with communication terminal 108, the present terminals consist of only communication terminal 108. However, if a conference call has already been set up consisting of communication terminals 106, 107, and 108, then the present terminals that will be placed on hold are communication terminals 107 and 108. If communication terminal 106 is only engaged in a multimedia call with communication terminal 108, communication terminal 108 is referred to as the "first terminal". After execution of block 1002, block 1003 receives the dialing information from communication terminal 106 that designates the new terminal. Once the dialing information has been received, block 1004 requests that the lower software layers of FIG. 4 place a new call to the new terminal. Decision block 1009 determines if the new call is answered. If the answer is no, block 1012 is executed which takes the present call off of hold and returns communication terminal 106 to the present call. If the answer in decision block 1009 is yes, block 1010 sends a message to CMA 127 requesting that the new call be added to the conference call. Note, if a conference call has not been established, CMA 127 will take the necessary steps to start a multimedia conference call. Finally, block 1011 updates the call table as illustrated in FIG. 13. FIG. 13 illustrates the state where communication terminal 106 and communication terminal 108 were engaged in a multimedia call and wireless terminal 103 was merged into that call to create a multimedia conference call. When the user of wireless terminal 123 places communication terminal 107 onto the multimedia conference call and disconnects wireless terminal 123, the number "107" will replace the number "123" in FIG. 13.

Returning to decision block 1001 if the conference button has not been actuated, control is transferred to decision block 1006. Decision block 1006 determines if another terminal has transmitted a TRANS message to change the bandwidth of the other terminal's conference path into the multimedia conference call. If the answer is yes, block 1007 is executed to send back the TRANS_COM message. Block 1008 then sends a change message to CMA 127. The change message specifies the communication type-bandwidth change and the communication terminal transmitting the change.

If the answer in decision block 1006 is no, control is transferred to decision block 1013 which determines if a message had been received from another terminal indicating that the other terminal was disconnecting. If the answer is yes, block 1014 sends a disconnect message to CMA 127, and block 1015 removes the other terminal from the call table illustrated in FIG. 13.

If the answer in decision block 1013 is no, decision block 1016 determines if communication terminal 106 is requesting a change in communication types. If the answer is yes, a change message is sent to 1017 indicating the added or deleted communication types, and block 1018 changes the bandwidth to communication terminal 106. CMA 127 will request that the physical networks within switch node 101 add or subtract the bandwidth as required on the physical networks.

If the answer in decision block 1016 is no, decision block 1019 determines if communication terminal 106 is disconnecting. If the answer is yes, block 1021 sends a disconnect message to CMA 127, and TMA 128 sends disconnect messages to all communication terminals presently on the multimedia conference call. In addition, block 1022 clears the call table of FIG. 13.

If the answer in decision block 1019 is no, decision block 1023 determines if a notify request has been received from CMA 127. If the answer is no, block 1028 performs normal processing. If the answer is yes, decision block 1025 determine whether the notify request is for communication terminal 106. If the answer is yes, block 1027 informs communication terminal 106 of the changes so that communication terminal 106 can perform the proper functions. If the answer in decision block 1024 is no, block 1026 requests that the lower software layers as illustrated in FIG. 4 send notify messages to the designated terminals in the notify request from CMA 127. The transmission and function of notify messages in a multimedia conference call are set out in U.S. Pat. No. 5,373,549.

FIG. 11 illustrates the operations performed by CMA 127 of FIG. 1. Decision block 1101 determines if a message requesting the addition of a new terminal to a multimedia conference call has been received from TMA 128. If the answer is yes, decision block 1102 determines if communication terminal 106 is presently engaged in a multimedia conference call. If the answer is yes, the new terminal is added to the conference table of FIG. 12. Block 1112 then requests that the new terminal be added to the multimedia conference call by transmission of a request to CM 129. Note, that when block 1111 added the new terminal to the conference table of FIG. 12, the "communication types" column was also updated. After execution of block 1106, 1109, or 1112, block 1113 sends notify requests to inform the communication terminals that are participating in the multimedia conference call of the changes that have been made in the participation in the multimedia conference call.

Returning to decision block 1101, if the answer is no, decision block 1107 determines if a change message was received from TMA 128. If the answer is yes, block 1108 requests changes be made to the physical networks or data links of switch node 101 by CM 129. Block 1109 then updates the conference table of FIG. 12.

If the answer in decision block 1107 is no, decision block 1114 determines if a disconnect message was received from TMA 128. If the answer is yes, block 1116 removes the disconnected terminal from the conference table of FIG. 12. Block 1117 requests that TMA 128 send out notify messages indicating that the disconnected terminal is no longer part of the multimedia conference call. Decision block 1118 determines if there are more than two terminals in the conference table of FIG. 12. If the answer in decision block 1118 is yes, decision block 1123 determines if the disconnected terminal was the TMA's terminal, communication terminal 106. If the answer is yes, block 1124 removes the conference table of FIG. 12. The conference legs from the other communication terminals had already been removed by block 1022 of FIG. 10. However, if the answer in decision block 1118 is no, decision block 1119 removes the conference table and requests that TMA 128 send out notify messages to inform the remaining terminals that the conference call has ended.

Figure 14:
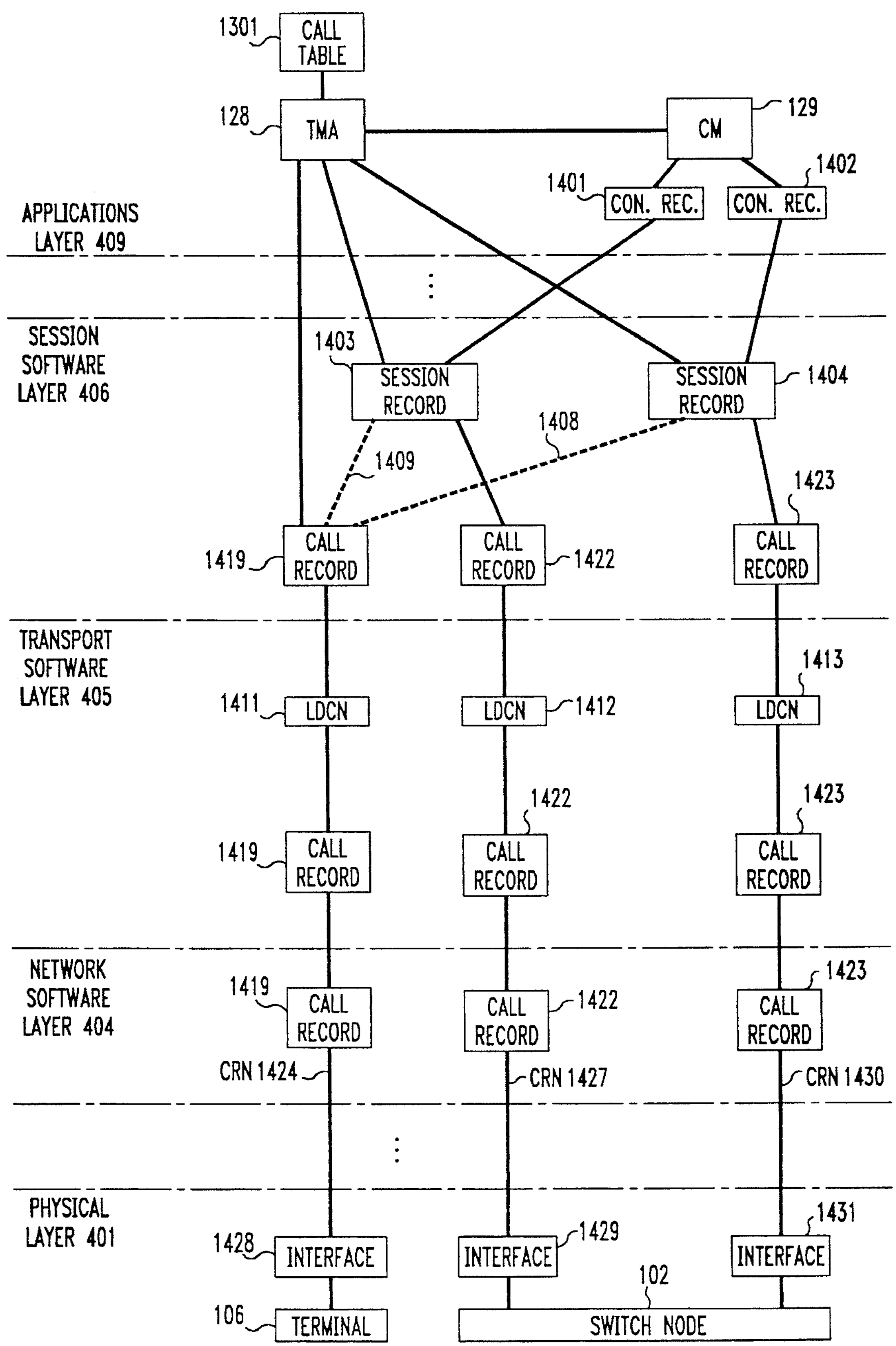
FIG. 14 illustrates the logical structure of two calls through the network, transport, session, and application software layers.

FIG. 14 illustrates the various records and logical control links for two calls terminated on terminal 106 whose control functions are handled by TMA 128. Software layers 401 through 409 are being executed on a switch node 101 that connects to terminal 106. Interface 1428 terminates PRI link 118, and interfaces 1429 and 1431 terminate PRI links 111 and 114, respectively. As illustrated in FIG. 14, terminal 106 is engaged in two calls. One call is handled by session record 1403; while the second call is handled by session record 1404. The right half of the first call terminates on interface 1429 and utilizes CRN 1427 and call record 1422. The right half of the second call terminates on interface 1431 and utilizes CRN 1430 and call record 1423. From a control point of view, the left half of both calls terminate on TMA 128. TMA 128 provides all of the necessary control functions. The signalling from terminal 106 also terminates on TMA 128 utilizing CRN 1424, call record 1419, and LDCN 1411. TMA 128 and terminal 106 communicates with each other using INFO messages. For example, if the user of terminal 106 wishes to switch from talking to the party on the first call to talking to the party on the second call, the user actuates the button identified with the second call on terminal 106. In response, terminal 106 transmits a INFO message to TMA 128 via PRI link 118. TMA 128 is responsive to this INFO message to control physical layer 401 such that the information portion of the second call is switched from interface 1431 to interface 1428. From a record identification point of view, both session record 1408 and session record 1404 identify that the left half of the call is using call record 1419 by the dashed lines 1409 and 1408, respectively. TMA 128 uses this information from session record 1403 or 1419 to identify the correct record during call processing. TMA 128 controls the indicators on terminal 106 by the transmission of INFO messages to that terminal. Connection record 1401 is used by the first call; and connection record 1402 is used by the second call.

FIG. 15 illustrates the results of a merge request being transmitted from TMA 128 to the lower software layers. TMA 128 makes the merge request upon receiving an INFO message from terminal 106 requesting that a conference be established between the first and second calls. The INFO message is generated in response to the user actuating a conference button on terminal 106. TMA 128 also requests that CMA 127 establish conference record 1201. The merge request identifies that session records 1403 and 1404 represent the calls that are to be merged together. The merge module of session software layer 406 is responsive to the merge request to establish merge record 1502 and to identify via the session records and call records that CRN 1427 and CRN 1430 and CRN 1424 are to be merged. Merge record 1502 identifies all signal transports utilized by session records 1404 and 1403.

After creating merge record 1502, the merge software module of session software layer 406 requests that CM 129 via CMA 127 at applications layer 409 combine all of the access points (call destination points) identified by connection records 1401 and 1402 of FIG. 14 into a single call record. CM 129 is responsive to this request to merge connection records 1401 and 1402 into a new connection record designated as connection record 1501. CM 129 then controls the physical network so that a conference bridge is created that combines the voice information being received via the two right halfs of the first and second calls with voice information being received over a single B channel for the left halfs of the calls. If the calls also used video, the CM 129 would control the video network so that a video bridge was established for the conference call.

If the terminal management application of switch node 103, that is controlling terminal 108, requests transmission of a TRANS message for the second call (which is identified by CRN 1430) to reduce the bandwidth from voice to low speed data, network software layer 404 is responsive to this TRANS message to perform the functions previously described with respect to FIG. 6. However, when a request is transmitted to the connection manager to remove the voice transport upon receipt of a TRANS_COM, CM 129 determines from connection record 1501 that the voice transport is still required for the first call. CM 129 however establishs the low speed data link that was requested by network software layer 404 in the TRANS message and acknowledged by the TRAN_COM message. The TRANS message is then transferred up to session software layer 406 and is identified by session record 1404. Session software layer 406 then transmits a TRANS request to TMA 128. TMA 128 is responsive to this request to transmit the information that the second call is being reduced to a data call to CMA 127. In addition, TMA 128 may send an INFO message to terminal 106 for display purposes. TMA 128 requests that physical layer 401 establish a data link to terminal 106.

If the terminal management application of switch node 103 controlling terminal 108 requests transmission of a TRANS message for the second call (which is identified by CRN 1426) to change the bandwidth on the second call from low speed data to voice, network software layer 404 is responsive to this TRANS message to perform the functions previously described with respect to FIG. 6. Upon receipt of a TRANS_COM message, network software layer 404 requests that CM 129 add the voice transport to the call and remove the low speed data. CM 129 determines from connection record 1501 that the voice transport must be combined into the conference call that is presently taking place and controls the physical network and the conference bridge to accomplish this. In addition, CM 129 controls the lower software layers to remove the low speed data link. As before, if video transport was being added to the conference call, the connection manager also controls the video network and the video conference bridge to place the second call into the conference.

FIG. 16 illustrates a communication terminal suitable for use as communication terminals 106, 107, or 108. Video screens 1607 and 1608 are intended to indicate a partitioning of display 1310 so as to allow each member of the multimedia conference to be displayed separately. As is well known in the art, there could be more video screens then two as illustrated in FIG. 16. The call state 1609 is intended to be utilized to display the various states and conditions of the multimedia conference call in text or graphical form.

It is to be understood that the above-described embodiments are merely illustrative of the principles of the invention and that other arrangements may be devised by those skilled in the an without departing from the spirit or scope of the invention.

The invention claimed is:

1. A method for controlling a multimedia conference call between a plurality of telecommunication terminals interconnected by a switching system having a plurality of switch nodes and one of the plurality of telecommunication terminals controlling the conference call, the method comprising the steps of:

implementing the conference call on first one of the plurality of switch nodes;

interconnecting each of the plurality of telecommunication terminals to the first one of the plurality of switch nodes by a communication path through the plurality of switch nodes where each communication path is through one or more of the plurality of switch nodes;

providing a plurality of communication types on the first one of the plurality of switch nodes;

managing the controlling one of the plurality of communication terminals by a terminal management application being executed by the first one of the plurality switch nodes;

receiving by the terminal management application all message transmitted to the controlling one of the plurality of communication terminals;

transmitting to the controlling one of the plurality of communication terminals by an individual one of the remaining ones of the plurality of communication terminals a first message to change the communication bandwidth varying the number of communication types on a first communication path used by the individual one of the remaining ones of the plurality of communication terminals; and changing in response to the first message only the number of communication types that the individual one of the remaining ones of the plurality of communication terminals uses to participate in the multimedia conference call by the switch nodes throughout the first communication path and by the first one of the plurality of switch nodes.

2. The method of claim 1 further comprises the step of transmitting to the controlling one of the plurality of communication terminals by a second individual one of the remaining ones of the plurality of communication terminals another first message to change the communication bandwidth on a second communication path used by the second individual one of the remaining ones of the plurality of communication terminals to be the same as the communication types being used by the first individual one of the remaining ones of the plurality of communication terminals; and changing in response to the other first message only the number of communication types that the second individual one of the remaining ones of the plurality of communication terminals uses to participate in the multimedia conference call by the switch nodes throughout the second communication path and by the first one of the plurality of switch nodes.

3. The method of claim 1 wherein the step of changing comprises the steps of transmitting a second message back to the first individual one of the plurality communication terminals by the terminal management application in response to receipt of the first message; and transmitting another second message back to the second individual one of the plurality communication terminals by the terminal management application in response to receipt of the other first message.

4. The method of claim 3 wherein the step of changing on the first communication path comprises the step of adding an additional communication type to the first communication path;

the step of changing on the second communication path comprises the step of adding the additional communication type to the second communication path; and the method further comprises the step of allowing the first and second individual ones of the remaining ones of the plurality of telecommunication terminals to communicate jointly using the additional communication type while still communicating with all other ones of the plurality of telecommunication terminals.

5. The method of claim 4 wherein the step of changing on the first communication path further comprises the step of updating a conference record to indicate changes in the number of communication types used by the first individual one of the plurality of communication terminals; and the step of changing on the second communication path further comprises the step of updating the conference record to indicate changes in the number of communication types used by the second individual one of the plurality of communication terminals.

6. A method for controlling changes in communication bandwidth for a plurality of communication paths of a multimedia conference call with each communication path interconnecting one of a plurality of telecommunication terminals into the multimedia conference call that is established on a switching system and the switching system being capable of providing a plurality of multimedia functions for the multimedia conference call with each of the plurality of multimedia functions requiring communication bandwidth, the method comprising the steps of:

using by all of the plurality of telecommunication terminals in the multimedia conference call a set of the plurality of multimedia functions;

receiving by the switching system a first message to increase the communication bandwidth on a first one of the plurality of the communication paths transmitted to one of the plurality of communication terminals controlling the multimedia conference call, where the first one of the plurality of communication paths interconnects a first one of the plurality of communication terminals to the switching system;

increasing the communication bandwidth on the first one of the plurality of communication paths by the switching system thereby giving an additional one of the plurality of multimedia functions not in the set of the plurality of multimedia functions to the first one of the plurality of telecommunication terminals;

receiving by the switching system a second message to increase the communication bandwidth on a second one of the plurality of the communication paths transmitted to the controlling one of the plurality of communication terminals where the second one of the plurality of communication paths interconnects a second one of the plurality of communication terminals to the switching system; and increasing the communication bandwidth on the second one of the plurality of communication paths by the switching system thereby giving the additional one of the plurality of multimedia functions to the second one of the plurality of telecommunication terminals and allowing the first and second ones of the plurality of telecommunication terminals to communicate jointly using the additional one of the plurality of multimedia functions while still communicating with the other ones of the plurality of telecommunication terminals using the set of multimedia functions.

7. The method of claim 6 further comprises the steps of receiving by the switching system a third message to decrease the communication bandwidth on a third one of the plurality communication paths transmitted to the controlling one of the plurality of communication terminals where the third one of the plurality of communication paths interconnects a third one of the plurality telecommunication terminals to the switching system;

decreasing the communication bandwidth on the third one of the plurality of communication paths by the switching system thereby removing one of the set of the plurality of multimedia functions from use by the third one of the plurality of communication terminals; and continuing to communicate with the remaining ones of the plurality of telecommunication terminals using the remaining ones of the set of the plurality of multimedia functions by the third one of the plurality of telecommunication terminals.

8. The method of claim 7 further comprises the steps of receiving by the switching system a fourth message to increase the communication bandwidth on the third one of the plurality communication paths transmitted to the controlling one of the plurality of communication terminals;

increasing the communication bandwidth on the third one of the plurality of communication paths by the switching system thereby adding the one of the set of the plurality of multimedia functions for use by the third one of the plurality of communication terminals; and communicating with the remaining ones of the plurality of telecommunication terminals using the set of the plurality of multimedia functions by the third one of the plurality of telecommunication terminals.

9. The method of claim 8 wherein the switching system comprises a plurality of switch nodes and the controlling one of the plurality of communication terminals is connected to a first one of plurality of switch nodes with the multimedia conference call being established on the first one of the plurality of switch nodes, and the method further comprises the steps of managing the controlling one of the plurality of communication terminals by a terminal management application being executed by the first one of the plurality switch nodes; and receiving all message transmitted to controlling one of the plurality of communication terminals.

10. The method of claim 9 further comprises the steps of receiving the first and second messages by the terminal management application;

determining by the terminal management application that the first and second messages result in the additional one of the plurality of multimedia functions being used the first and second ones of the plurality of communication terminals; and transmitting a fifth message to the remaining ones of the plurality of communication terminals other than the first and second ones of the plurality of communication terminals informing those remaining ones of the plurality of communication terminals that the first and second ones of the plurality of communication terminals are now using the additional one of the plurality of multimedia functions.

11. The method of claim 10 further comprises the steps of receiving the third message by the terminal management application;

determining by the terminal management application that the third message removes the one of the set of the plurality of multimedia functions from use by the third one of the plurality of communication terminals; and transmitting a sixth message to the remaining ones of the plurality of communication terminals other than the third one of the plurality of communication terminals informing those ones of the plurality of communication terminals that the third one of the plurality of communication terminals is not using the one of the set of the plurality of multimedia functions.

12. The method of claim 11 further comprises the steps of receiving the fourth message by the terminal management application;

determining by the terminal management application that the third message adds the one of the set of the plurality of multimedia functions for use by the third one of the plurality of communication terminals; and transmitting a seventh message to the remaining ones of the plurality of communication terminals other than the third one of the plurality of communication terminals informing those ones of the plurality of communication terminals that the third one of the plurality of communication terminals is now using the one of the set of the plurality of multimedia functions.

13. The method of claim 6 further comprises the steps of transmitting the first message by the first one of the plurality communication terminals;

transmitting the second message by the second one of the plurality of communication terminals.

14. The method of claim 8 further comprises the steps of transmitting the third message by the third one of the plurality communication terminals; and transmitting the fourth message by the third one of the plurality of communication terminals.

15. An apparatus for controlling a multimedia conference call between a plurality of telecommunication terminals interconnected by a switching system having a plurality of switch nodes and one of the plurality of telecommunication terminals controlling the conference call, comprising:

means for implementing the conference call on first one of the plurality of switch nodes;

means for interconnecting each of the plurality of telecommunication terminals to the first one of the plurality of switch nodes by a communication path through the plurality of switch nodes where each communication path is through one or more of the plurality of switch nodes;

means for providing a plurality of communication types on the first one of the plurality of switch nodes;

means in a terminal management application being executed in the first one of the plurality of switch nodes for managing the controlling one of the plurality of communication terminals;

means in a terminal management application for receiving all message transmitted to the controlling one of the plurality of communication terminals;

means in an individual one of the remaining ones of the plurality of communication terminals for transmitting to the controlling one of the plurality of communication terminals a first message to change the communication bandwidth varying the number of communication types on a first communication path used by the individual one of the remaining ones of the plurality of communication terminals; and means in the switch nodes throughout the first communication path and in the first one of the plurality of switch nodes for changing in response to the first message only the number of communication types that the individual one of the remaining ones of the plurality of communication terminals uses to participate in the multimedia conference call.

16. The apparatus of claim 15 further comprises means in a second individual one of the remaining ones of the plurality of communication terminals for transmitting to the controlling one of the plurality of communication terminals another first message to change the communication bandwidth on a second communication path used by the second individual one of the remaining ones of the plurality of communication terminals to be the same as the communication types being used by the first individual one of the remaining ones of the plurality of communication terminals; and means in the switch nodes throughout the second communication path and in the first one of the plurality of switch nodes for changing in response to the other first message only the number of communication types that the second individual one of the remaining ones of the plurality of communication terminals uses to participate in the multimedia conference call.

17. The apparatus of claim 15 wherein the means in the terminal management application for changing comprises means for transmitting a second message back to the first individual one of the plurality communication terminals in response to receipt of the first message; and means for transmitting another second message back to the second individual one of the plurality communication terminals in response to receipt of the other first message.

18. The apparatus of claim 17 wherein the means for changing on the first communication path comprises means for adding an additional communication type to the first communication path;

the means for changing on the second communication path comprises means for adding the additional communication type to the second communication path; and means in the first one of the plurality of switch nodes for allowing the first and second individual ones of the remaining ones of the plurality of telecommunication terminals to communicate jointly using the additional communication type while still communicating with all other ones of the plurality of telecommunication terminals.

19. The apparatus of claim 18 wherein the means for changing on the first communication path further comprises means for updating a conference record to indicate changes in the number of communication types used by the first individual one of the plurality of communication terminals; and the means for changing on the second communication path further comprises means for updating the conference record to indicate changes in the number of communication types used by the second individual one of the plurality of communication terminals.

20. An apparatus for controlling changes in communication bandwidth for a plurality of communication paths of a multimedia conference call with each communication path interconnecting one of a plurality of telecommunication terminals into the multimedia conference call that is established on a switching system and the switching system being capable of providing a plurality of multimedia functions for the multimedia conference call with each of the plurality of multimedia functions requiring communication bandwidth, comprising:

means in all of the plurality of telecommunication terminals for using in the multimedia conference call a set of the plurality of multimedia functions;

means in the switching system for receiving a first message to increase the communication bandwidth on a first one of the plurality of the communication paths transmitted to one of the plurality of communication terminals controlling the multimedia conference call where the first one of the plurality of communication paths interconnects a first one of the plurality of communication terminals to the switching system;

means in the switching system for increasing the communication bandwidth on the first one of the plurality of communication paths thereby giving an additional one of the plurality of multimedia functions not in the set of the plurality of multimedia functions to the first one of the plurality of telecommunication terminals;

means in the switching system for receiving a second message to increase the communication bandwidth on a second one of the plurality of the communication paths transmitted to the controlling one of the plurality of communication terminals where the second one of the plurality of communication paths interconnects a second one of the plurality of communication terminals to the switching system; and means in the switching system for increasing the communication bandwidth on the second one of the plurality of communication paths thereby giving the additional one of the plurality of multimedia functions to the second one of the plurality of telecommunication terminals and allowing the first and second ones of the plurality of telecommunication terminals to communicate jointly using the additional one of the plurality of multimedia functions while still communicating with the other ones of the plurality of telecommunication terminals using the set of multimedia functions.

21. The apparatus of claim 20 further comprises means in the switching system for receiving a third message to decrease the communication bandwidth on a third one of the plurality communication paths transmitted to the controlling one of the plurality of communication terminals where the third one of the plurality of communication paths interconnects a third one of the plurality telecommunication terminals to the switching system;

means in the switching system for decreasing the communication bandwidth on the third one of the plurality of communication paths thereby removing one of the set of the plurality of multimedia functions from use by the third one of the plurality of communication terminals; and means in the third one of the plurality of telecommunication terminals for continuing to communicate with the remaining ones of the plurality of telecommunication terminals using the remaining ones of the set of the plurality of multimedia functions.

22. The apparatus of claim 21 further comprises means in the switching system for receiving a fourth message to increase the communication bandwidth on the third one of the plurality communication paths transmitted to the controlling one of the plurality of communication terminals;

means in the switching system for increasing the communication bandwidth on the third one of the plurality of communication paths thereby adding the one of the set of the plurality of multimedia functions for use by the third one of the plurality of communication terminals; and means in the third one of the plurality of telecommunication terminals for communicating with the remaining ones of the plurality of telecommunication terminals using the set of the plurality of multimedia functions.

23. The apparatus of claim 22 wherein the switching system comprises a plurality of switch nodes and the controlling one of the plurality of communication terminals is connected to a first one of plurality of switch nodes with the multimedia conference call being established on the first one of the plurality of switch nodes, and the apparatus further comprises means in a terminal management application being executed by the first one of the plurality switch nodes for managing the controlling one of the plurality of communication terminals; and means in the terminal application for receiving all message transmitted to controlling one of the plurality of communication terminals.

24. The apparatus of claim 23 further comprises means in the terminal management application for receiving the first and second messages;

means in the terminal management application for determining in the terminal management application that the first and second messages result in the additional one of the plurality of multimedia functions being used the first and second ones of the plurality of communication terminals; and means in the terminal application for transmitting a fifth message to the remaining ones of the plurality of communication terminals other than the first and second ones of the plurality of communication terminals informing those remaining ones of the plurality of communication terminals that the first and second ones of the plurality of communication terminals are now using the additional one of the plurality of multimedia functions.

25. The apparatus of claim 24 further comprises means in the terminal management application for receiving the third message;

means in the terminal management application for determining that the third message removes the one of the set of the plurality of multimedia functions from use by the third one of the plurality of communication terminals; and means in the terminal application for transmitting a sixth message to the remaining ones of the plurality of communication terminals other than the third one of the plurality of communication terminals informing those ones of the plurality of communication terminals that the third one of the plurality of communication terminals is not using the one of the set of the plurality of multimedia functions.

26. The apparatus of claim 25 further comprises means in the terminal management application for receiving the fourth message;

means in the terminal management application for determining that the third message adds the one of the set of the plurality of multimedia functions for use by the third one of the plurality of communication terminals; and means for transmitting a seventh message to the remaining ones of the plurality of communication terminals other than the third one of the plurality of communication terminals informing those ones of the plurality of communication terminals that the third one of the plurality of communication terminals is now using the one of the set of the plurality of multimedia functions.

27. The apparatus of claim 20 further comprises means in the first one of the plurality communication terminals for transmitting the first message;

means in the second one of the plurality of communication terminals for transmitting the second message.

28. The apparatus of claim 22 further comprises means in the third one of the plurality communication terminals for transmitting the third message; and means in the third one of the plurality of communication terminals for transmitting the fourth message.

* * * * *